US012766992B2

(12) United States Patent
Matsuda et al.

(10) Patent No.: US 12,766,992 B2
(45) Date of Patent: Oct. 20, 2026

(54) COMPUTATION SYSTEM, CHARGING PLAN CREATION PROGRAM, AND DISCHARGING PLAN CREATION PROGRAM

(71) Applicant: Panasonic Intellectual Property Management Co., Ltd., Osaka (JP)

(72) Inventors: Takashi Matsuda, Osaka (JP); Changhui Yang, Osaka (JP); Takashi Iida, Hyogo (JP); Atsuyoshi Kita, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 576 days.

(21) Appl. No.: 18/249,259

(22) PCT Filed: Oct. 20, 2021

(86) PCT No.: PCT/JP2021/038696
§ 371 (c)(1),
(2) Date: Apr. 17, 2023

(87) PCT Pub. No.: WO2022/091894
PCT Pub. Date: May 5, 2022

(65) Prior Publication Data

US 2023/0391221 A1 Dec. 7, 2023

(30) Foreign Application Priority Data

Oct. 27, 2020 (JP) ................................ 2020-179419

(51) Int. Cl.
*B60L 53/64* (2019.01)
*B60L 58/16* (2019.01)
(Continued)

(52) U.S. Cl.
CPC ............... *B60L 53/64* (2019.02); *B60L 58/16* (2019.02); *B60L 58/18* (2019.02); *H02J 7/82* (2026.01); *H02J 7/92* (2026.01); *H02J 7/933* (2026.01)

(58) Field of Classification Search
CPC .......... B60L 53/64; B60L 58/16; B60L 58/18; H02J 7/82; H02J 7/92; H02J 7/933; H02J 7/971; G06Q 10/04
See application file for complete search history.

(56) References Cited

U.S. PATENT DOCUMENTS 8,169,186 B1 * 5/2012 Haddad .................. B60L 53/37 180/205.1
10,345,391 B2 7/2019 Basu et al.
(Continued)

FOREIGN PATENT DOCUMENTS

CN 101668652 A 3/2010
CN 105848978 A 8/2016
(Continued)

OTHER PUBLICATIONS

Extended (Supplementary) European Search Report dated Mar. 6, 2024, issued in counterpart EP Application No. 21886013.8. (8 pages).
(Continued)

*Primary Examiner* — Zhipeng Wang
(74) *Attorney, Agent, or Firm* — WHDA, LLP

(57) ABSTRACT

A path finder sets a plurality of nodes in a state of charge (SOC) zone that is between a target SOC, which is set when a secondary battery provided in an electric moving body is charged, and a present SOC, and sets a plurality of nodes in a chargeable time period that is between a charging start time and a charging end time. A cost assigner refers to at least one of storage degradation characteristics, charge cycle degradation characteristics, or a time-of-use electricity fee
(Continued)

table to assign a cost of a degradation amount or an electricity fee to each path between nodes. The path finder finds the charging path that minimizes a total cost of the paths between the nodes. A charging plan creator creates a charging plan based on the charging path found.

16 Claims, 16 Drawing Sheets

(51) Int. Cl.

| | |
|---|---|
| ***B60L 58/18*** | (2019.01) |
| ***H02J 7/82*** | (2026.01) |
| ***H02J 7/90*** | (2026.01) |
| ***H02J 7/92*** | (2026.01) |

(56) References Cited

U.S. PATENT DOCUMENTS

| | | | | |
|---|---|---|---|---|
| 2010/0102776 | A1 | 4/2010 | Uchida | |
| 2013/0119939 | A1* | 5/2013 | Yonezawa | H02J 7/00 320/134 |
| 2013/0285608 | A1* | 10/2013 | Jikihara | B60L 53/80 320/109 |
| 2014/0136448 | A1 | 5/2014 | Takayama et al. | |
| 2016/0297318 | A1 | 10/2016 | Kirimoto | |
| 2017/0187210 | A1* | 6/2017 | Cogill | H04W 4/029 |
| 2017/0338668 | A1* | 11/2017 | Sada | H02J 3/32 |
| 2018/0076633 | A1 | 3/2018 | Fujita et al. | |
| 2018/0222331 | A1* | 8/2018 | Erdem | H02J 3/14 |
| 2019/0039467 | A1* | 2/2019 | Hortop | H02J 7/0071 |
| 2020/0150185 | A1* | 5/2020 | Ramezan Pour Safaei | H02J 7/0071 |
| 2020/0180465 | A1* | 6/2020 | Watson | B60L 53/65 |
| 2021/0158291 | A1 | 5/2021 | Kita et al. | |
| 2021/0379999 | A1* | 12/2021 | Yang | B60L 58/13 |
| 2022/0200313 | A1 | 6/2022 | Ogasawara et al. | |

FOREIGN PATENT DOCUMENTS

| | | | |
|---|---|---|---|
| EP | 2458704 | A1 | 5/2012 |
| JP | 6651063 | B | 2/2020 |
| JP | 2020-092598 | | 6/2020 |
| WO | 2020/090341 | A1 | 5/2020 |
| WO | 2020/158073 | A1 | 8/2020 |

OTHER PUBLICATIONS

International Search Report of PCT application No. PCT/JP2021/038696 dated Dec. 7, 2021.

English Translation of Search Report dated Jan. 21, 2026, issued in counterpart CN Application No. 202180072577.1 (2 pages).

Office Action dated Jul. 16, 2026, issued in counterpart IN Application No. 202347035897. (8 pages).

* cited by examiner

COMPUTATION SYSTEM, CHARGING PLAN CREATION PROGRAM, AND DISCHARGING PLAN CREATION PROGRAM

TECHNICAL FIELD

The present disclosure relates to a computation system, a charging plan creation program, and a discharging plan creation program which create a charging plan or a discharging plan for a secondary battery.

BACKGROUND ART

In recent years, electric vehicles (EV) and plug-in hybrid vehicles (PHV) have become popular. These electric vehicles are equipped with a secondary battery as a key device. Appropriate charge and discharge management of the secondary battery is required to reduce degradation of the secondary battery and extend the life of the secondary battery.

Cost management is highly required for commercial vehicles such as delivery vehicles. It is desired to create a charging plan that reduces the degradation of the secondary battery during the nighttime when the electricity fees are low. When creating the charging plan, it is necessary to create an optimal charging plan according to daily changes in the state of charge (SOC) before charging and the time available for charging.

With respect to the creation of a charging plan, control for changing the charging pattern in real time according to the state of internal parameters has been proposed. Such a control is based on the premise of fast charging, and an upper limit current value that is less likely to cause degradation is set (see, for example, Patent Literature (PTL) 1). Moreover, in view of storage degradation and cycle degradation, control for determining the SOC at time of storage during which charging and discharging are not performed has been proposed (see, for example, PTL 2).

CITATION LIST

Patent Literature

[PTL 1] Japanese Unexamined Patent Application Publication No. 2020-092598
[PTL 2] Japanese Patent No. 6651063

SUMMARY OF THE INVENTION

In the conventional controls, current control, time control, and SOC control while charging is suspended cannot be optimized at the same time.

The present disclosure has been conceived in view of such circumstances. An object of the present disclosure is to provide a technique for creating a charging plan or a discharging plan that minimizes costs, such as degradation of a secondary battery.

In order to solve the above problem, a computation system according to one aspect of the present disclosure includes: a path finder which (sets a plurality of nodes in a state of charge (SOC) zone that is between a target SOC and a present SOC of a secondary battery provided in an electric moving body, (ii) sets a plurality of nodes in a chargeable time period that is between a charging start time and a charging end time, and (iii) finds a charging path from the present SOC at the charging start time to the target SOC at the charging end time via nodes among the plurality of nodes set in the SOC zone and the chargeable time period, the target SOC being set when the secondary battery is charged; a charging plan creator which creates a charging plan based on the charging path found; a cost assigner which refers to at least one of a storage degradation characteristic, a charge cycle degradation characteristic, or a time-of-use electricity fee table to assign a cost of a degradation amount or an electricity fee to each of paths between the plurality of nodes, the storage degradation characteristic defining a storage degradation rate that is defined by at least one element including at least one of the SOC or a temperature of the secondary battery, the charge cycle degradation characteristic defining a cycle degradation rate at a time of charging that is defined by at least one element including at least one of the SOC or a current rate of charging current of the secondary battery. The path finder finds a charging path that minimizes a total cost of paths between the nodes.

It should be noted that any combination of the above-described structural elements and results of conversion of the representation of the present disclosure between devices, methods, systems, computer programs, etc. are also effective as aspects of the present disclosure.

According to the present disclosure, it is possible to create a charging plan or a discharging plan that minimizes costs such as degradation of a secondary battery.

DESCRIPTION OF EMBODIMENT

Figure 1:
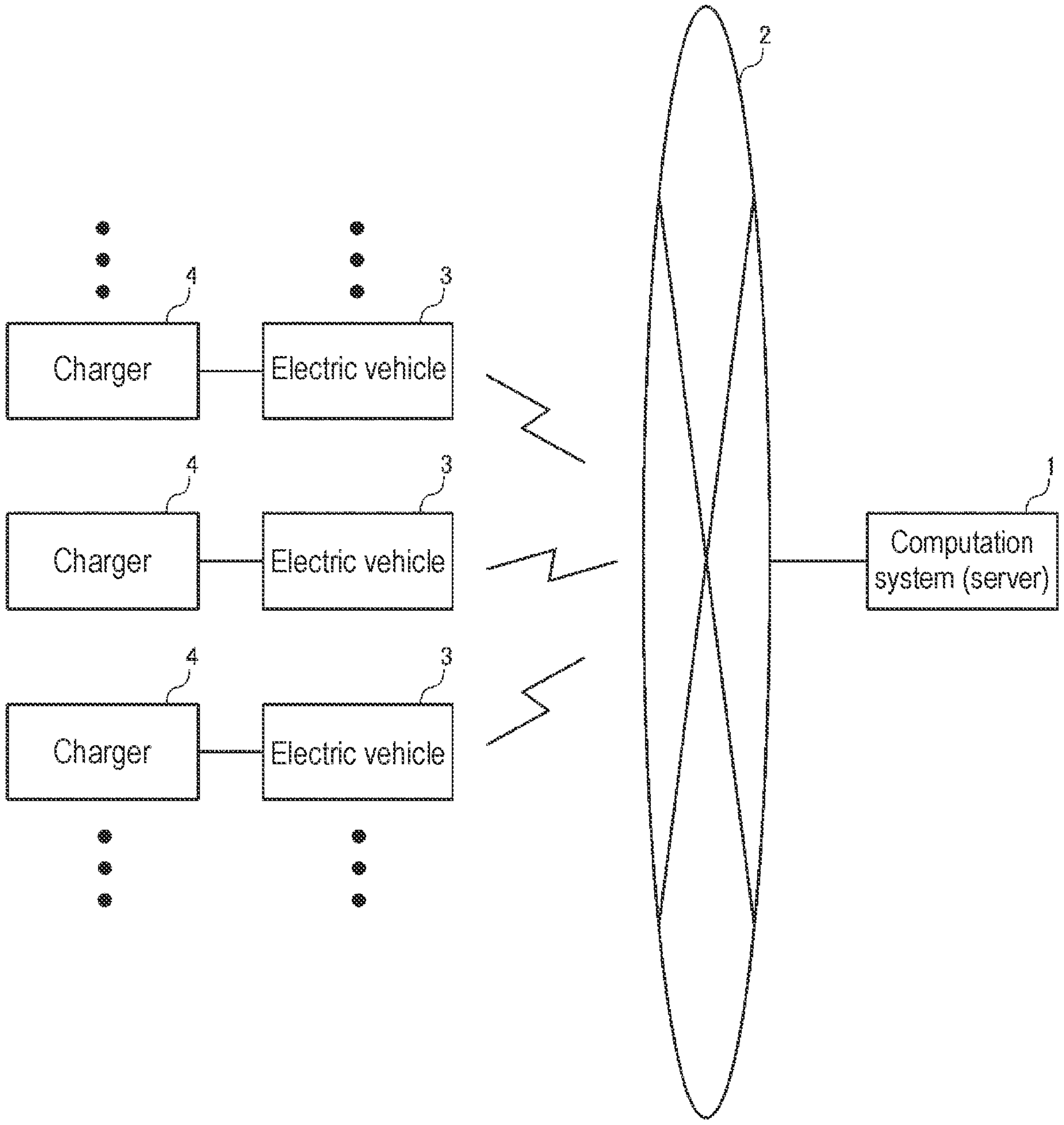
FIG. 1 is a diagram for explaining an outline of a computation system according to an embodiment.

FIG. 1 is a diagram for explaining an outline of computation system 1 according to an embodiment. Computation system 1 is a system used by a business operator that operates delivery business, bus business, taxi business, rental car business, car sharing business, and the like. Computation system 1 is a system for managing business of the business operator. Computation system 1 includes one or more information processing devices (for example, a server or a personal computer (PC)). Part or all of the information processing devices included in computation system 1 may be present in a data center. For example, computation system 1 may be configured with a combination of a server in the data center and a client PC in the business operator.

The business operator (in this description, a delivery company is assumed) owns a plurality of electric vehicles 3 and a plurality of chargers 4, and utilizes electric vehicles 3 for the delivery business. In the present embodiment, each electric vehicle 3 is assumed to be a pure electric vehicle (EV) without an engine.

Each of electric vehicles 3 includes a wireless communication function, and is connectable to network 2 to which computation system 1 is connected. Electric vehicle 3 is capable of transmitting battery data of a secondary battery included in electric vehicle 3 to computation system 1 via network 2. Electric vehicle 3 may transmit the battery data while electric vehicle 3 is parked in the parking lot of the business office or in the garage, or while electric vehicle 3 is traveling.

Network 2 is a general term for communication paths such as the Internet and dedicated lines, and any communication medium or protocol may be used. Examples of the communication medium that can be used include a mobile phone network (cellular network), wireless local area network (LAN), wired LAN, optical fiber network, asymmetric digital subscriber line (ADSL) network, and community antenna television (CATV) network. Examples of the communication protocol that can be used include transmission control protocol (TCP)/internet protocol (IP), user datagram protocol (UDP)/IP, and Ethernet (registered trademark).

It may be that electric vehicle 3 is connected to the server or PC of the business operator via a peer-to-peer (P2P) network to directly transmit the battery data of the secondary battery included in electric vehicle 3 to the server or PC of the business operator. It may also be that the battery data is transferred to the server or PC of the business operator via a recording medium on which the battery data is recorded. Electric vehicle 3 may also transmit the battery data to the server or PC of the business operator via charging adapter 6 (see FIG. 2) to be described later.

Figure 2:
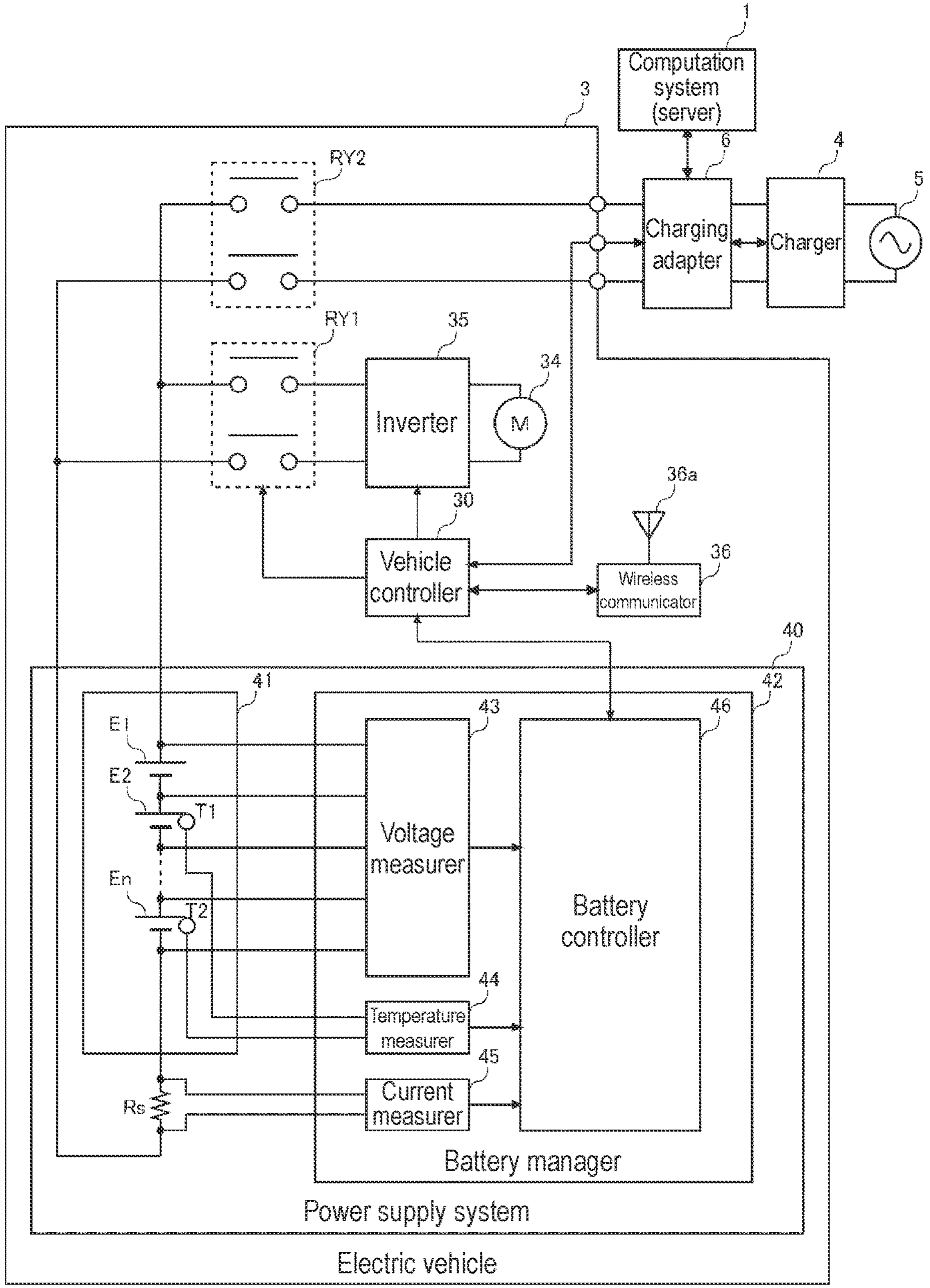
FIG. 2 is a diagram for explaining a detailed configuration of a power supply system provided in an electric vehicle according to the embodiment.

FIG. 2 is a diagram for explaining a detailed configuration of power supply system 40 provided in electric vehicle 3 according to the embodiment. Power supply system 40 is connected to motor 34 via first relay RY1 and inverter 35. During powering, inverter 35 converts the direct-current (DC) power supplied, from power supply system 40 into alternating-current (AC) power, and supplies the AC power to motor 34. During regeneration, the AC power supplied from motor 34 is converted into DC power, and the DC power is supplied to power supply system 40. Motor 34 is a three-phase AC motor, and rotates according to the AC power supplied from inverter 35 during powering. During regeneration, rotational energy due to deceleration is converted into AC power, and the AC power is supplied to inverter 35.

Vehicle controller 30 is a vehicle electronic control unit (ECU) that controls the entire electric vehicle 3, and may be configured with, for example, an integrated vehicle control module (VCM). Wireless communicator 36 performs signal processing for wireless connection to network 2 via antenna 36*a*. Examples of the wireless communication network to which electric vehicle 3 can be wirelessly connected include a mobile phone network (cellular network), wireless LAN, electronic toll collection system (ETC), dedicated short range communications (DSRC), vehicle-to-infrastructure (V2I), and vehicle-to-vehicle (V2V).

First relay RY1 is a contactor disposed between lines connecting power supply system 40 and inverter 35. When the vehicle is traveling, vehicle controller 30 turns first relay RY1 into an ON state (closed state) to electrically connect power supply system 40 and the power system of electric vehicle 3. When the vehicle is not traveling, in principle, vehicle controller 30 turns first relay RY1 into an OFF state (open state) to electrically disconnect power supply system 40 from the power system of electric vehicle 3. Note that other types of switches, such as semiconductor switches, may be used instead of relays.

By connecting electric vehicle 3 to charger 4, battery module 41 in power supply system 40 can be externally charged. In the present embodiment, electric vehicle 3 is connected to charger 4 via charging adapter 6. Charging adapter 6 is attached to, for example, the tip of the terminal of charger 4. When charging adapter 6 is attached to charger 4, the controller in charging adapter 6 establishes a communication channel with the controller in charger 4.

When charging adapter 6 attached to charger 4 and electric vehicle 3 are connected by a charging cable, battery module 41 in electric vehicle 3 can be charged from charger 4. Charging adapter 6 lets the electric power supplied from charger 4 to pass through charging adapter 6 to electric vehicle 3. Charging adapter 6 includes a wireless communication function, and is capable of exchanging data with computation system 1. Charging adapter 6 functions as a gateway that relays communications between electric vehicle 3 and charger 4, between electric vehicle 3 and computation system 1, and between charger 4 and computation system 1.

Charger 4 is connected to commercial power system 5, and charges power supply system 40 in electric vehicle 3. In electric vehicle 3, second relay RY2 is disposed between lines connecting power supply system 40 and charger 4. Note that other types of switches, such as semiconductor switches, may be used instead of relays. Battery manager 42 turns on second relay RY2 directly or via vehicle controller 30 before charging starts, and turns off second relay RY2 after charging ends.

Generally, batteries are charged with alternating current for normal charging and with direct current for fast charging. When charging with AC (for example, single-phase 100/200 V) is performed, an AC/DC converter (not illustrated) disposed between second relay RY2 and power supply system 40 converts the AC power into DC power. When charging with DC, charger 4 generates DC power by full-wave rectifying the AC power supplied from commercial power system 5 and smoothing the rectified DC power with a filter.

Example of the fast charging standards that can be used include CHAdeMO (registered trademark), ChaoJi, GB/T, and combined charging system (Combo). CHAdeMO 2.0 defines the maximum output (specification) as 1000 V×400 A=400 kW. CHAdeMO 3.0 defines the maximum output (specification) as 1500 V×600 A=900 kW. ChaoJi defines the maximum output (specification) as 1500 V×600 A=900 kW. GBIT defines the maximum output (specification) as 750 V×250 A=185 kW. Combo defines the maximum output (specification) as 900 V×400 A=350 kW. CHAdeMO, ChaoJi, and GB/T employ controller area network (CAN) as a communication scheme. Combo employs power line communication (PLC) as a communication scheme.

A charging cable adopting the CAN system also includes a communication line in addition to a power line. When electric vehicle 3 and charging adapter 6 are connected with the charging cable, vehicle controller 30 establishes a communication channel with the controller in charging adapter 6. In addition, in the charging cable adopting the PLC system, a communication signal is superimposed on the power line and transmitted.

Vehicle controller 30 establishes a communication channel with battery manager 42 via an in-vehicle network (for example, CAN or local interconnect network (LIN)). When the communication standard between vehicle controller 30 and the controller in charging adapter 6 is different from the communication standard between vehicle controller 30 and battery manager 42, vehicle controller 30 functions as a gateway.

Although details will be described later, in the present embodiment, computation system 1 includes a function of creating an optimum charging plan (charging schedule). Upon receiving the charging plan from computation system 1, the controller in charging adapter 6 transfers the received charging plan to the controller in charger 4. In such a case, even when the controller in charging adapter 6 receives a command value for the charging current from vehicle controller 30, the controller in charging adapter 6 does not transfer the command value to the controller in charger 4. When the controller in charging adapter 6 receives the upper limit values (limit values) of power, current, and voltage from vehicle controller 30, the controller in charging adapter 6 transfers the upper limit values to the controller in charger 4.

It is preferable that charging adapter 6 is configured with a small housing. In this case, the driver of electric vehicle 3 is able to easily carry charging adapter 6, and is able to attach charging adapter 6 to another charger 4, which is other than chargers 4 provided in the office, for use. For example, charging adapter 6 can be attached to charger 4 provided in public facilities, commercial facilities, gas stations, car dealers, and service areas of highways as charger 4 other than chargers 4 provided in the office, and used. In this case, battery module 41 in electric vehicle 3 can also be charged from charger 4 outside the office based on the charging plan created by computation system 1.

Power supply system 40 provided in electric vehicle 3 includes battery module 41 and battery manager 42. Battery module 41 includes a plurality of cells E1-En connected in series. Battery module 41 may include a plurality of cells connected in series and parallel. Battery module 41 may be configured by combining a plurality of battery modules. Lithium-ion battery cells, nickel-hydrogen battery cells, lead-acid battery cells, and the like can be used for the cells. Hereinafter, in the present description, an example is assumed where lithium-ion battery cells (nominal voltage: 3.6-3.7 V) are used. The number of cells E1-En connected in series is determined according to the driving voltage of motor 34.

Shunt resistor Rs is connected in series with cells E1-En. Shunt resistor Rs functions as a current sensing element. A Hall element may be used instead of shunt resistor Rs. A plurality of temperature sensors T1 and T2 for detecting the temperatures of cells E1-En are disposed in battery module 41. One temperature sensor may be disposed in a battery module, or one temperature sensor may be disposed for each set of a plurality of cells. Thermistors, for example, can be used as temperature sensors T1 and T2.

Battery manager 42 includes voltage measurer 43, temperature measurer 44, current measurer 45, and battery controller 46. Respective nodes of cells E1-En connected in series and voltage measurer 43 are connected by a plurality of voltage lines. Voltage measurer 43 measures the voltage of each of cells E1-En by measuring the voltage between two adjacent voltage lines. Voltage measurer 43 transmits the measured voltage of each of cells E1-En to battery controller 46.

Since voltage measurer 43 has a higher voltage than battery controller 46, voltage measurer 43 and battery controller 46 are connected by a communication line while being insulated from each other. Voltage measurer 43 can be configured with an application specific integrated circuit (ASIC) or a general-purpose analog front-end IC. Voltage measurer 43 includes a multiplexer and an A/D converter. The multiplexer sequentially outputs voltages between two adjacent voltage lines to the A/D converter. The A/D converter converts the analog voltage input from the multiplexer into a digital value.

Temperature measurer 44 includes resistor voltage dividers and an A/D converter. The A/D converter sequentially converts a plurality of analog voltages divided, by temperature sensors T1 and T2 and a plurality of resistor voltage dividers into digital values, and outputs the digital values to battery controller 46. Battery controller 46 estimates the temperatures of cells E1-En based on the digital values. For example, battery controller 46 estimates the temperature of each of cells E1-En based on the value measured by the temperature sensor closest to each cell E1-En.

Current measurer 45 includes a differential amplifier and an A/D converter. The differential amplifier amplifies the voltage across shunt resistor Rs, and outputs the amplified voltage to the A/D converter. The A/D converter converts the analog voltage input from the differential amplifier into a digital value, and outputs the digital value to battery controller 46. Battery controller 46 estimates currents flowing through cells E1-En based on the digital values.

When battery controller 46 includes an A/D converter and an analog input port, it may be that temperature measurer 44 and current measurer 45 output the analog voltages to battery controller 46, and the A/D converter in battery controller 46 converts the analog voltages into digital values.

Battery controller 46 manages the states of cells E1-En based on the voltages, temperatures, and currents of cells E1-En measured by voltage measurer 43, temperature measurer 44, and current measurer 45. Battery controller 46 can be configured with a microcomputer and a non-volatile memory (for example, (electrically erasable programmable read-only memory (EEPROM) or flash memory). Battery controller 46 estimates the SOC and state of health (SOH) of each of cells E1-En.

Battery controller 46 estimates the SOC by combining an open circuit voltage (OCV) method and a current integration method. The OCV method is a method of estimating the SOC based on the OCV of each cell E1-En measured by voltage measurer 43 and the SOC-OCV curves of cells E1-En. The SOC-OCV curves of cells E1-En are created in advance based on characteristic tests performed by the battery manufacturer and recorded in the internal memory of the microcomputer at the time of shipment.

The current integration method is a method of estimating the SOC based on the OCV at the start of charging and discharging of cells E1-En and the integrated value of the current measured by current measurer 45. In the current integration method, the measurement errors of current measurer 45 are accumulated more as the length of the charging and discharging time periods increase. Accordingly, it is preferable to correct the SOC estimated by the current integration method, using the SOC estimated by the OCV method.

The SOH is defined by the ratio of the present full charge capacity (FCC) to the initial FCC, and the lower the value (closer to 0%), the more advanced the degradation. The SOH may be obtained by capacity measurement by complete charging and discharging, or may be obtained by adding up the storage degradation and cycle degradation.

The SOH can also be estimated based on the correlation with the internal resistance of the cell. The internal resistance can be estimated by dividing the voltage drop that occurs when a given current is applied to the cell for a given period of time, by the current value. The internal resistance decreases as the temperature rises, and the internal resistance increases as the SOH decreases.

Battery controller 46 transmits the voltages, temperatures, currents, SOCs and SOHs of cells E1-En to vehicle controller 30 via the in-vehicle network. Vehicle controller 30 transmits battery data including the present SOCs, SOHs, and temperatures of cells E1-En to computation system 1.

Figure 3:
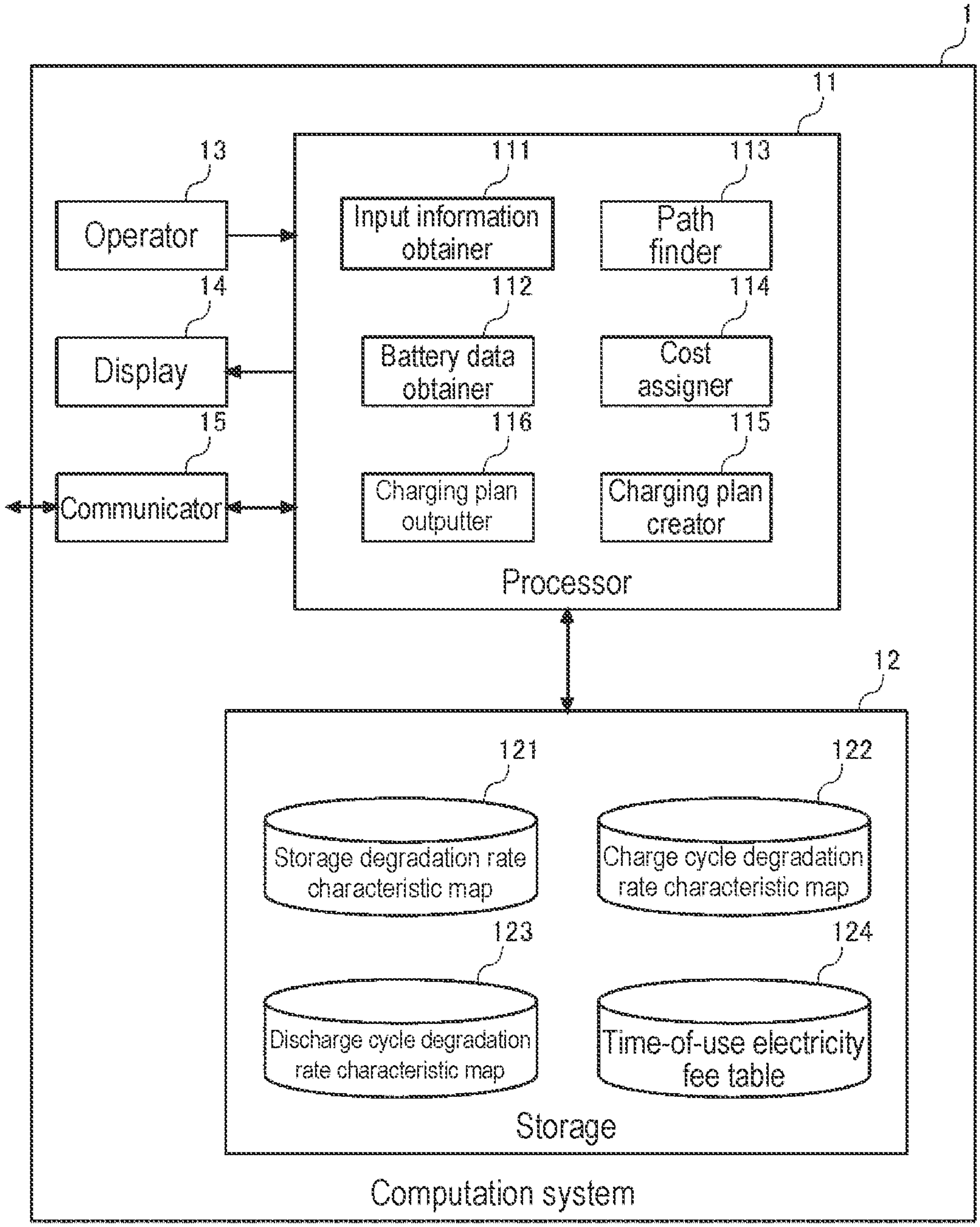
FIG. 3 illustrates configuration example 1 of the computation system according to the embodiment.

FIG. 3 illustrates configuration example 1 of computation system 1 according to the embodiment. Computation system 1 includes processor 11, storage 12, operator 13, display 14, and communicator 15. Processor 11 includes input information obtainer 111, battery data obtainer 112, path finder 113, cost assigner 114, charging plan creator 115, and charging plan outputter 116. The functions of processor 11 can be realized by cooperation of hardware resources and software resources, or only by hardware resources. Examples of the hardware resources that can be used include central processing unit (CPU), read only memory (ROM), random access memory (RAM), graphics processing unit (GPU), application specific integrated circuit (ASIC), field programmable gate array (FPGA), and other large scale integration (LSD. Programs, such as operating systems and applications, can be used as software resources.

Storage 12 includes storage degradation rate characteristic map 121, charge cycle degradation rate characteristic map 122, discharge cycle degradation rate characteristic map 123, and time-of-use electricity fee table 124. Storage 12 includes a non-volatile recording medium, such as solid state drive (SSD) and hard disk drive (HDD), and records various programs and data.

Storage degradation rate characteristic map 121, charge cycle degradation rate characteristic map 122, and discharge cycle degradation rate characteristic map 123 are obtained by mapping the storage degradation rate characteristics, the charge cycle degradation rate characteristics, and the discharge cycle degradation rate characteristics of the secondary battery provided in electric vehicle 3. The storage degradation rate characteristics, the charge cycle degradation rate characteristics, and the discharge cycle degradation rate characteristics of secondary batteries are derived in advance for each secondary battery product through experiments and simulations performed by battery manufacturers. Note that data derived by other evaluation organizations may also be used.

Storage degradation is degradation that progresses over time in accordance with the temperature and the SOC of the secondary battery at each time point. The storage degradation progresses over time regardless of whether charging or discharging is being performed. Storage degradation is caused mainly by the formation of a film (solid electrolyte interphase (SEI) film) on the negative electrode. Storage degradation depends on the SOC and temperature at each time point. Generally, the storage degradation rate increases as the SOC at each time point increases or the temperature at each time point increases.

Cycle degradation is degradation that progresses as the number of times charging and discharging are performed increases. Cycle degradation is mainly caused by cracking or peeling due to expansion or contraction of the active material. Cycle degradation depends on the current rate, the SOC range used, and the temperature. Generally, the cycle degradation rate increases with an increase in the current rate, the SOC range used, and the temperature.

Figure 4A:
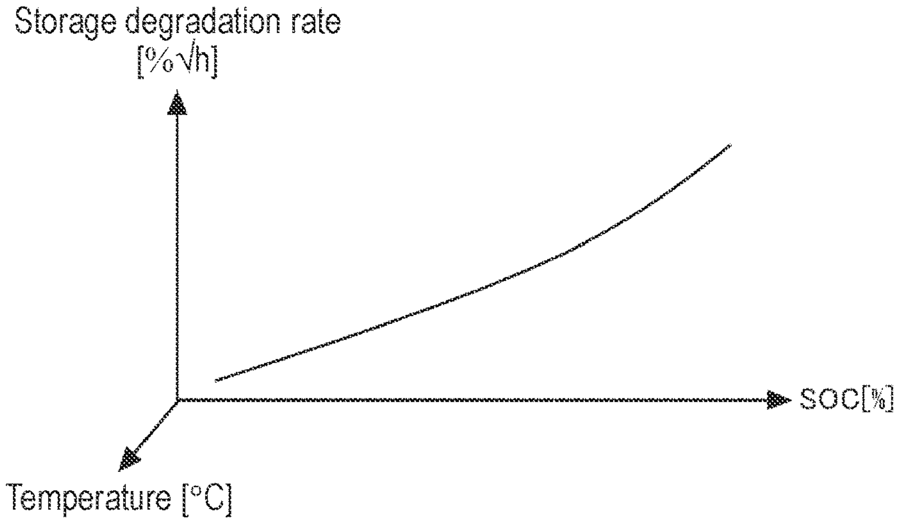
FIG. 4A illustrates a schematic example of a storage degradation rate characteristic map.
Figure 4B:
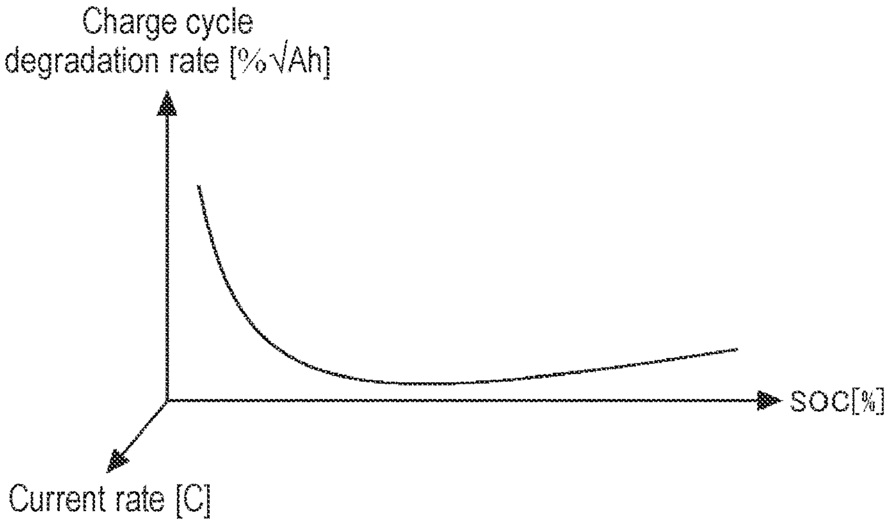
FIG. 4B illustrates a schematic example of a charge cycle degradation rate characteristic map.
Figure 4C:
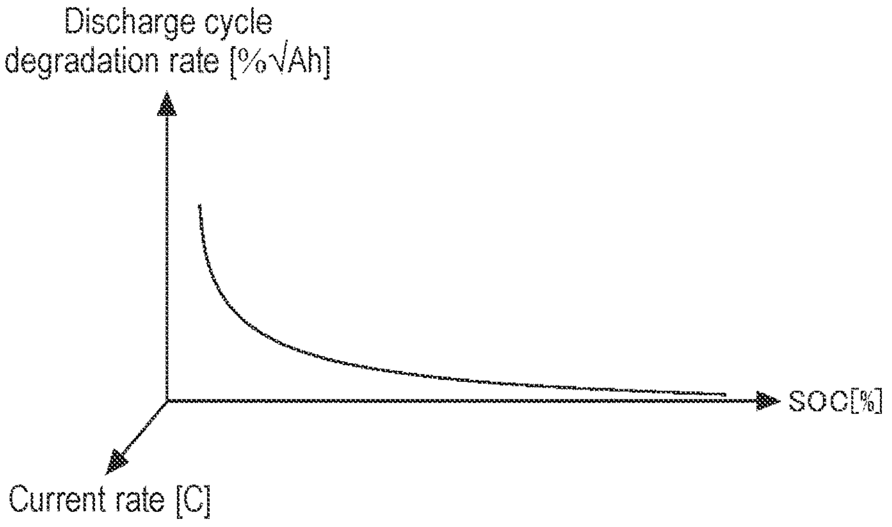
FIG. 4C illustrates a schematic example of a discharge cycle degradation rate characteristic map.

FIG. 4A to FIG. 4C illustrate schematic examples of the storage degradation rate characteristic map, the charge cycle degradation rate characteristic map, and the discharge cycle degradation rate characteristic map. FIG. 4A illustrates a schematic example of the storage degradation rate characteristic map. The X-axis indicates SOC [%], the Y-axis indicates temperature [° C.], and the Z-axis indicates storage degradation rate [%/√h]. Storage degradation is known to progress in accordance with the 0.5 power law (square root) of time h (hour). As illustrated in FIG. 4A, the storage degradation rate increases as the SOC increases.

FIG. 4B illustrates a schematic example of the charge cycle degradation rate characteristic map. The X-axis indicates the SOC use range [%], the Y-axis indicates the current rate [C], and the Z-axis indicates the charge cycle degradation rate [%/√Ah]. Cycle degradation is assumed to progress in accordance with the 0.5 power law (square root) of ampere hour (Ah). As illustrated in FIG. 4B, when charging is performed in the low SOC region, the charge cycle degradation rate increases. In addition, when charging is performed in the high SOC region, too, the charge cycle degradation rate increases, though not as fast as in the low SOC region.

FIG. 4C illustrates a schematic example of the discharge cycle degradation rate characteristic map. The X-axis indicates the SOC use range [%], the Y-axis indicates the current rate [C], and the Z-axis indicates the discharge cycle degradation rate [%/√Ah]. The discharge cycle degradation rate increases as discharging is performed in a lower SOC region.

The cycle degradation characteristics are also influenced by temperature, although not as much as the influence by the current rate. Accordingly, in order to increase the estimation accuracy of the cycle degradation rate, it is preferable to prepare cycle degradation characteristics that define the relationship between the SOC use range and the cycle degradation rate for respective two-dimensional combinations of current rates and temperatures. On the other hand, when generating a simple cycle degradation rate characteristic map, it is only necessary to prepare cycle degradation rate characteristics for each of a plurality of current rates while assuming the temperature as room temperature.

The storage degradation rate characteristics, the charge cycle degradation rate characteristics, and the discharge cycle degradation rate characteristics may be defined by functions instead of maps.

Referring back to FIG. 3, time-of-use electricity fee table 124 is a table indicating the electricity fees for each time slot contracted with an electric power company. Nighttime electricity fees are often set lower than daytime electricity fees. In addition, for daytime electricity fees, a pay-as-you-go system is often adopted in which the electricity fees per 1 kWh increase in stages with an increase in the cumulative power consumption.

Electric power companies in Japan offer a variety of fee plans. Examples of such plans provided include: (a) a plan that sets fees according to the amount of use regardless of the time of day or day of the week; (b) a plan that sets low fees for the time slot from 1:00a.m. to 9:00a.m.; (c) a plan that sets low fees for the time slot from 9:00p.m. to 5:00a.m. the following morning; (d) a plan that sets low fees for the time slot from 9:00p.m. to 9:00a.m. the following morning; (e) a plan that sets low fees for the time slot from 11:00p.m. to 7:00a.m. the following morning; (f) a plan that sets low fees for the time slot from 10:00p.m. to 8:00a.m. the following morning; (g) a plan that sets low fees for Saturdays an d Sundays; (h) a plan for the summer season divided into three time slots with relatively high fees during the peak hours (1:00p.m. to 4:00p.m.) and low fees during the night time (from 11:00p.m. to 7:00a.m. the following morning); and (i) a plan that sets detailed fees by “season” and “time slot”, and sets low fees for the time slot from 11:00p.m. to 7:00a.m. the following morning.

In the case of a large business operator, such as the delivery business, according to the present embodiment, it is also possible to set a more detailed and customized fee plan through a separate contract between the business operator and the electric power company.

Operator 13 is a user interface such as a keyboard, a mouse, and a touch panel, and receives an operation of the user of computation system 1. Display 14 includes a display such as a liquid crystal display or an organic electro-luminescent (EL) display, and displays an image generated by processor 11. Communicator 15 performs communication processing for communicating with charging adapter 6, electric vehicle 3, or charger 4 directly or via network 2.

Input information obtainer 111 obtains the target SOC, charging start time, and charging end time for charging battery module 41 provided in electric vehicle 3, which are input from operator 13. The time period from the charging start time to the charging end time is the time period available for charging.

Battery data obtainer 112 obtains battery data of battery module 41 from vehicle controller 30 of electric vehicle 3 via communicator 15. The battery data includes at least the present SOCs of cells E1-En included in battery module 41. The battery data may also include the present SOHs and temperatures of cells E1-En.

Path finder 113 sets a plurality of nodes at a predetermined interval in the SOC zone that is between the obtained target SOC and present SOC. For example, the nodes are set in increments of 0.5%. The nodes may be set in different increments such as 1%, 5%, or 10%.

Path finder 113 sets a plurality of nodes at a predetermined interval in the chargeable time period that is between the obtained charging start time and the obtained charging end time. For example, nodes are set in increments of 30 minutes. The nodes may be set in different increments, such as 3 minutes, 5 minutes, 10 minutes, or 15 minutes.

Path finder 113 sets paths between the nodes set in a matrix pattern. Cost assigner 114 refers to storage degradation rate characteristic map 121 and charge cycle degradation rate characteristic map 122 to assign degradation costs to paths between nodes. Path finder 113 finds the charging path that minimizes the total degradation cost of paths between nodes. Charging plan creator 115 creates a charging plan based on the found charging path. Charging plan outputter 116 transmits the created charging plan to charger 4 via charging adapter 6. Specific examples will be described below.

Figure 5:
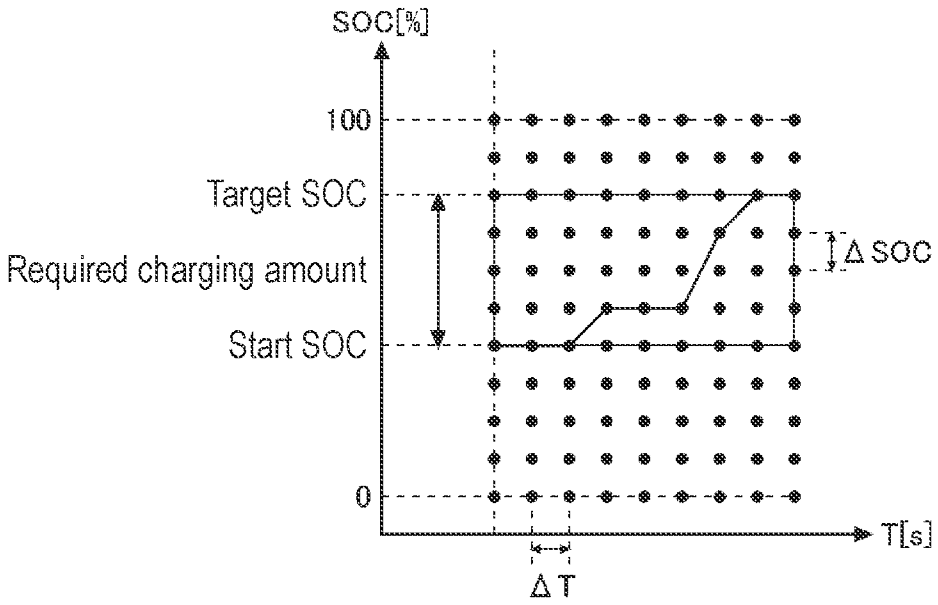
FIG. 5 illustrates an example of charging path finding.

FIG. 5 illustrates an example of charging path finding. FIG. 5 illustrates an example where the start SOC is 40% and the target SOC is 80%. The present SOC obtained by battery data obtainer 112 is set to the start SOC. The power amount corresponding to the SOC range between the target SOC and the start SOC corresponds to the required charging amount. Path finder 113 finds the optimum path from the start SOC to the target SOC within the limited time period available for charging.

Figure 6:
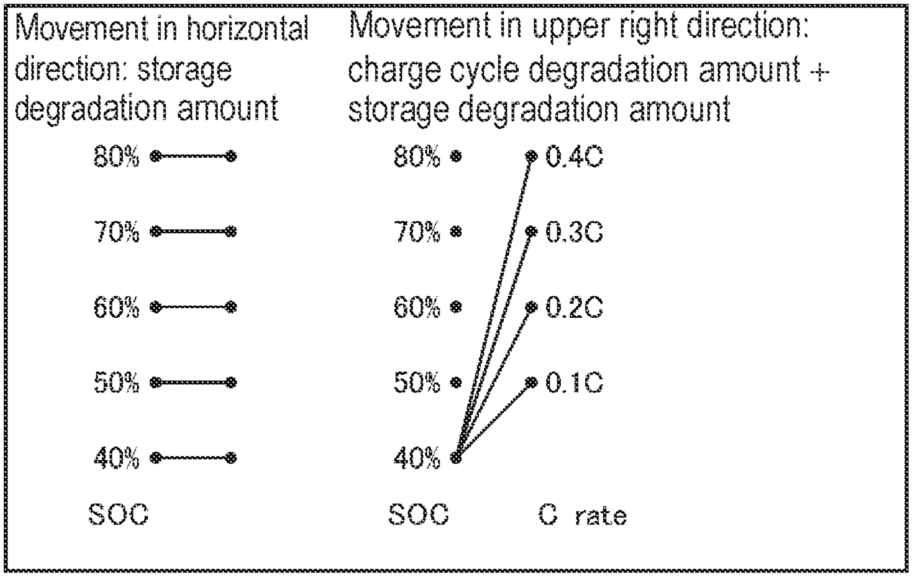
FIG. 6 is a diagram for explaining an example of assignment of degradation costs to paths.

FIG. 6 is a diagram for explaining an example of assignment of degradation costs to paths. As illustrated in FIG. 5, in the charging path according to the present embodiment, charging can be suspended in units of ΔT [s]. While charging is suspended, only storage degradation progresses.

As illustrated in FIG. 6, cost assigner 114 refers to storage degradation rate characteristic map 121 to calculate, as a degradation cost, the degradation amount generated each of when charging is suspended for units of time (ΔT) at the SOC of 40%, when charging is suspended for units of time (ΔT) at the SOC of 50%, when charging is suspended for units of time (ΔT) at the SOC of 60%, when charging is suspended for units of time (ΔT) at the SOC of 70%, and when charging is suspended for units of time (ΔT) at the SOC of 80%. Since the SOC basically does not change while charging is suspended, the movement between nodes while charging is suspended is in the horizontal direction.

When the cell temperature is 40° or less, the temperature has little effect on the storage degradation rate, so that cost assigner 114 is capable of assuming that the temperature is room temperature. In that case, cost assigner 114 obtains the storage degradation rate between nodes in the horizontal direction based on the room temperature and the SOC. Cost assigner 114 multiplies the storage degradation rate between nodes in the horizontal direction by units of time (ΔT) to calculate the degradation amount between nodes in the horizontal direction.

Note that cost assigner 114 may assume that the present cell temperature obtained by battery data obtainer 112 continues till the charging end time. In that case, cost assigner 114 obtains the storage degradation rate between nodes in the horizontal direction based on the obtained temperature and SOC. Cost assigner 114 multiplies the storage degradation rate between nodes in the horizontal direction by units of time (ΔT) to calculate the degradation amount between nodes in the horizontal direction.

It may also be that cost assigner 114 obtains weather forecast information for the area where charger 4 is provided from a weather forecast server (not illustrated), and estimates the temperatures between nodes in the horizontal direction from the charging start time to the charging end time. In that case, cost assigner 114 obtains the storage degradation rate between nodes in the horizontal direction based on the estimated temperatures and SOCs between the nodes in the horizontal direction. Cost assigner 114 multiplies the storage degradation rate between nodes in the horizontal direction by units of time (ΔT) to calculate the degradation amount between nodes in the horizontal direction.

On the other hand, during charging, both of the charge cycle degradation and the storage degradation progress. As illustrated in FIG. 6, cost assigner 114 calculates the current rate (0.1 C in the example illustrated in FIG. 6) for reaching SOC 50% from SOC 40% in units of time (ΔT), the current rate (0.2 C in the example illustrated in FIG. 6) for reaching SOC 60% from SOC 40% in units of time (ΔT), the current rate (0.3 C in the example illustrated in FIG. 6) for reaching SOC 70% from SOC 40% in units of time (ΔT), and the current rate (0.4 C in the example illustrated in FIG. 6) for reaching SOC 80% from SOC 40% in units of time (ΔT). Since the SOC increases during charging, the movement between nodes during charging is in the upper right direction.

Although not illustrated in FIG. 6, cost assigner 114 also calculates the current rate for reaching SOC 60% from SOC 50% in units of time (ΔT), the current rate for reaching SOC 70% from SOC 50% in units of time (ΔT), the current rate for reaching SOC 80% from SOC 50% in units of time (ΔT), the current rate for reaching SOC 70% from SOC 60% in units of time (ΔT), the current rate for reaching SOC 80% from SOC 60% in units of time (ΔT), and the current rate for reaching SOC 80% from SOC 70% in units of time (ΔT).

Cost assigner 114 refers to charge cycle degradation rate characteristic map 122 based on the SOC range and the current rate for each path between nodes in the upper right direction to identify the charge cycle degradation rate. Cost assigner 114 refers to storage degradation rate characteristic map 121 based on the SOC and the temperature to identify the storage degradation rate. For the SOC used to identify the storage degradation rate, for example, the average value of the upper limit value and the lower limit value of the SOC range may be used.

Cost assigner 114 calculates, for each path between nodes in the upper right direction, the charge cycle degradation amount of the path between nodes in the upper right direction by multiplying the identified charge cycle degradation rate by the current amount (Ah) corresponding to the unit of SOC (ΔSOC). Cost assigner 114 multiplies the identified storage degradation rate by units of time (ΔT) for each path between nodes in the upper right direction to calculate the storage degradation amount of the path between nodes in the upper right direction. Cost assigner 114 adds up the calculated charge cycle degradation amount and storage degradation amount for each path between nodes in the upper right direction to calculate the final degradation amount.

In practice, not all paths between nodes can be passed as charging paths, and there is limitation by current or time.

Figure 7:
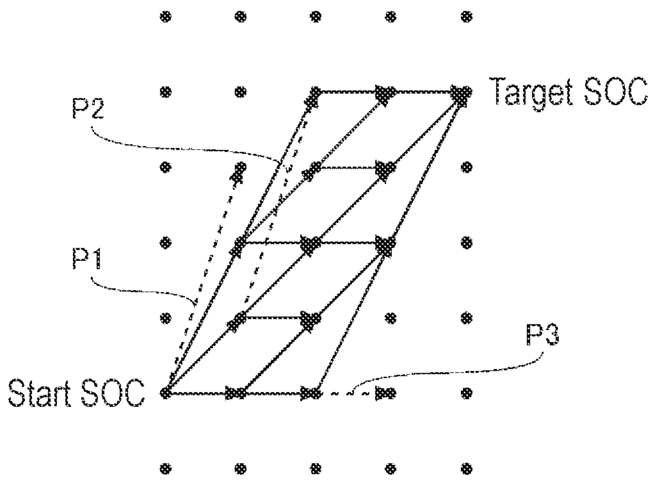
FIG. 7 is a diagram for specifically explaining path current limitation and time limitation.

FIG. 7 is a diagram for specifically explaining path current limitation and time limitation. First, time does not go backwards, so there is no path which moves to the left. Also, in the case of charging, since the SOC basically does not decrease, paths always move to the upper right or to the right, and there is no path which moves to the lower right.

The upper limit values of charging power and charging current are defined for each charger 4 in accordance with the specification of charger 4. Accordingly, it is not possible to perform charging exceeding the upper limit value of the charging current of charger 4. Similarly, the upper limit values of charging power and charging current of each electric vehicle 3 is defined in accordance with the specification of electric vehicle 3. Accordingly, it is not possible to perform charging exceeding the upper limit value of the charging current of electric vehicle 3.

Computation system 1 holds, in an upper limit value table (not illustrated) in storage 12, the upper limit values of charging power and charging current for each charger 4 and the upper limit values of charging power and charging current for each electric vehicle 3. The upper limit values of the charging power and charging current of charger 4 and the upper limit values of the charging power and charging current of electric vehicle 3 may be input by the user via operator 13, or may be obtained from charger 4 or electric vehicle 3 when computation system 1 performs communication with charger 4 or electric vehicle 3 for the first time.

Among the paths between nodes calculated in FIG. 6, cost assigner 114 invalidates each path whose current rate required to pass the path exceeds the upper limit value of the charging current of charger 4 or electric vehicle 3.

In the example illustrated in FIG. 7, paths P1 and P2 are invalidated due to current limitation. In such a manner, the angle of movement in the upper right direction is limited b the limitation based on the upper limit current. Path P3 is a path that cannot be passed due to limitations based on the remaining time and the tipper limit current. Use of path P3 does not allow the target SOC to be reached within the remaining time within the range of the permitted angle of movement in the upper right direction. Accordingly, path P3 is invalidated.

Path finder 113 finds the charging path that minimizes the total degradation amount of paths between nodes. Specifically, path finder 113 calculates the total storage degradation amount and the total charge cycle degradation amount of each charging path based on (formula 1) and (formula 2) below. Path finder 113 adds up the total storage degradation amount and the total charge cycle degradation amount to calculate the total degradation amount of each charging path. Path finder 113 selects the charging path that minimizes the total degradation amount.

Total storage degradation amount=≈(Σ(Δ*T***Ks*^2)) (Formula 1)

Storage degradation rate *Ks* [%/√*h*]=storage degradation map (SOC [%], temperature [° C.])

Total charge cycle degradation amount=√(Σ(ΔΔ*h***Kc*^2)) (Formula 2)

Charge cycle degradation rate *Kc*[%/√*Ah*]=Charge cycle degradation map (SOC [1%], current rate [C])

Path finder 113 is capable of finding the charging path that minimizes the total degradation amount of paths between nodes using an existing path finding algorithm. For example, Dijkstra's algorithm can be used as a path finding algorithm. Path finding algorithms are commonly used in car navigation systems.

Figure 8A:
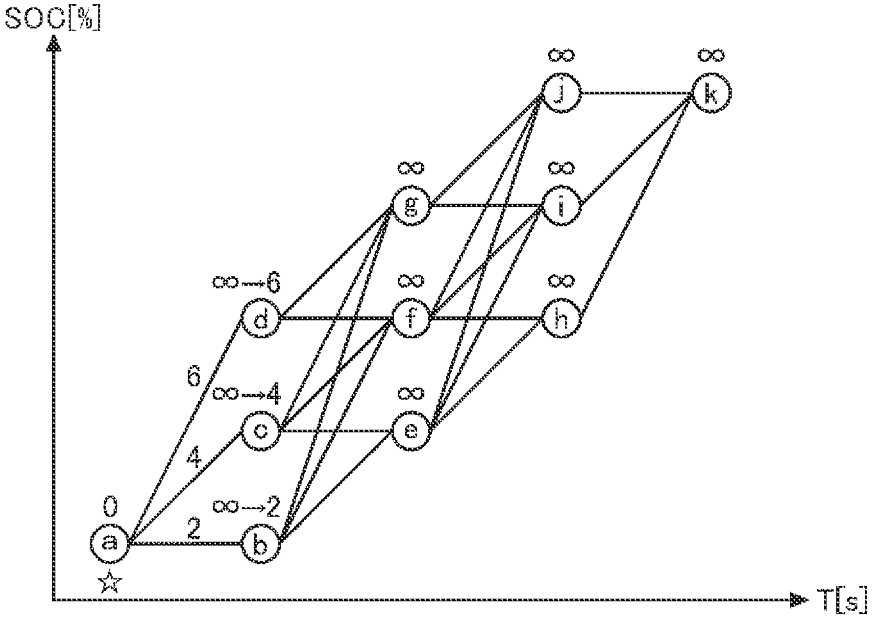
FIG. 8A is a diagram for explaining an example of charging path finding using Dijkstra's algorithm (No. 1).
Figure 8B:
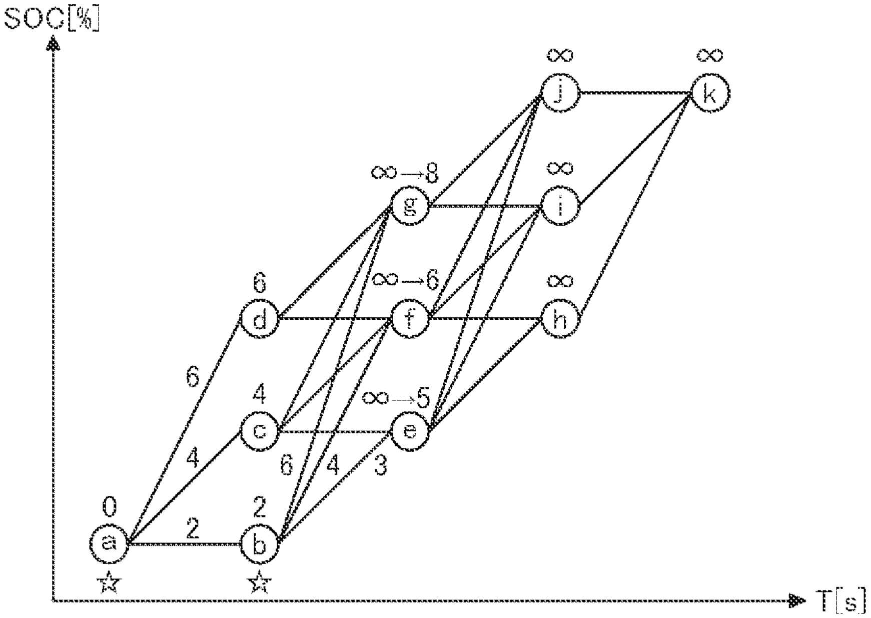
FIG. 8B is a diagram for explaining an example of the charging path finding using Dijkstra's algorithm (No. 1).
Figure 9A:
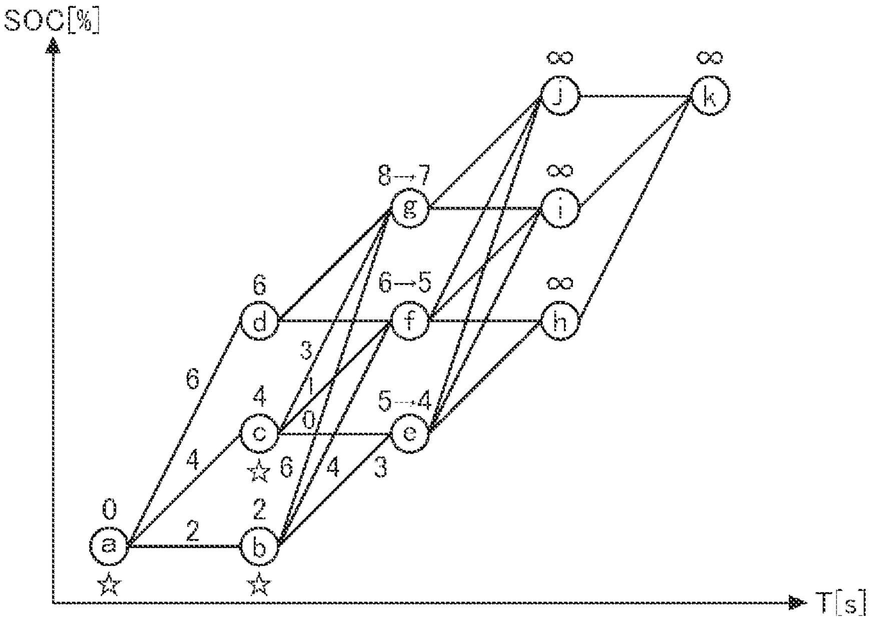
FIG. 9A is a diagram for explaining an example of the charging path finding using Dijkstra's algorithm (No. 2).
Figure 9B:
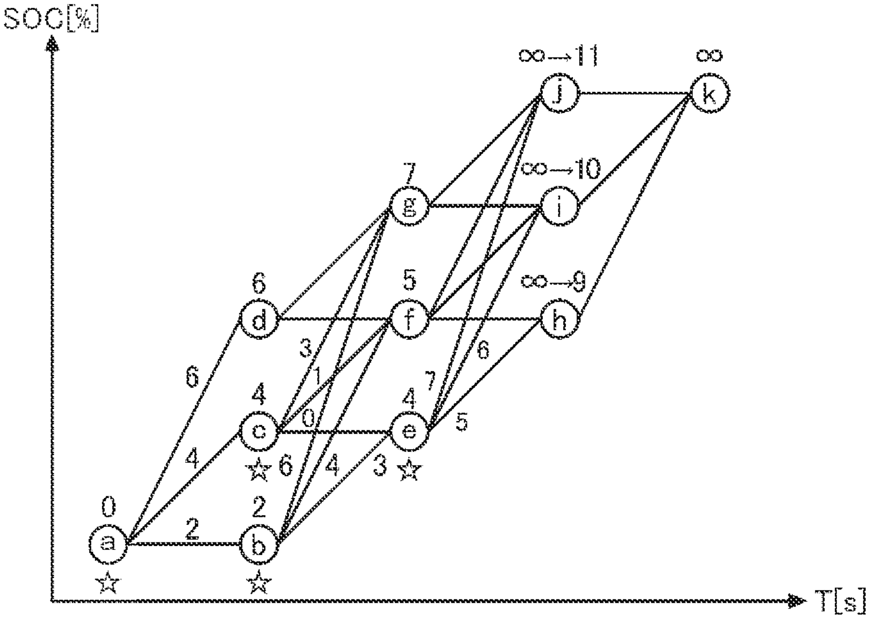
FIG. 9B is a diagram for explaining an example of the charging path finding using Dijkstra's algorithm (No. 2).

FIG. 8A and FIG. 8B are diagrams for explaining an example of a charging path finding using Dijkstra's algorithm (No. 1). FIG. 9A and FIG. 9B are diagrams for explaining an example of the charging path finding using Dijkstra's algorithm (No. 2). First, as initial processing, path finder 113 sets the distances to all nodes to infinity (o). Next, path finder 113 sets the distance to node a to zero. Subsequently, the same process is performed repeatedly.

Path finder 113 selects the node with the shortest distance from among the nodes with distances set to infinity, and determines the distance. In the example illustrated in FIG. 8A, the distance to node a is determined to be 0 (see star sign). Next, path finder 113 calculates distances to nodes b, c, and d connected to node a. In the example illustrated in FIG. 8A, the distances to nodes b, c, and d are 2, 4, and 6, respectively. When the distances to nodes b, c, and d are shorter than the distances previously set, path finder 113 updates the distances previously set to newly calculated distances. In the example illustrated in FIG. 8A, the distances to nodes b, c, and d are updated from ∞, ∞, ∞ to 2, 4, 6, respectively.

Next, path finder 113 selects the node with the shortest distance from among the nodes with distances set to infinity, and determines the distance. In the example illustrated in FIG. 8B, the distance to node b is determined to be 2 (see star sign). Next, path finder 113 calculates the total distances via nodes a-b for nodes e, f, and g connected to node b. In the example illustrated in FIG. 8B, the distances to nodes e, f, and g via nodes a-b are 5, 6, and 8, respectively. When the distances to nodes e, f, and g are shorter than the distances previously set, path finder 113 updates the distances previously set to newly calculated distances. In the example illustrated in FIG. 5B, the distances to nodes e, f, and g are updated from ∞, ∞, ∞ to 5, 6, 8, respectively.

Next, path finder 113 selects the node with the shortest distance from among the nodes with distances set to infinity, and determines the distance. In the example illustrated in FIG. 9A, the distance to node c is determined to be 4 (see star sign). Next, path finder 113 calculates the total distances via nodes a-c for nodes e, f, and g connected to node c. In the example illustrated in FIG. 9A, the distances to nodes e, f, and g via nodes a-c are 4, 5, and 7, respectively. When the distances to nodes e, f, and g are shorter than the distances previously set, path finder 113 updates the distances previously set to newly calculated distances. In the example illustrated in FIG. 9A, the distances to nodes e, f, and g are updated from 5, 6, and 8 to 4, 5, and 7, respectively.

Next, path finder 113 selects the node with the shortest distance from among the nodes with distances set to infinity, and determines the distance. In the example illustrated in FIG. 9B, the distance to node e is determined to be 4 (see star sign). Next, path finder 113 calculates the total distance via nodes a-c-e for each of nodes h, i, and j connected to node e. In the example illustrated in FIG. 9B, the distances to nodes h, i, and j via nodes a-c-e are 9, 10, and 11, respectively. When the distances to nodes h, i, and j are shorter than the distances previously set, path finder 113 updates the distances previously set to newly calculated distances. In the example illustrated in FIG. 9A, the distances to nodes h, i, and j are updated from ∞, ∞, ∞ to 9, 10, and 11, respectively. Subsequently, the same processes are repeated until the distances to all nodes are determined.

When path finder 113 finds the charging path that minimizes the degradation amount, charging plan creator 115 converts the found charging path into a charging plan defined by the charging start time and the current value for each unit of time. Charging plan outputter 116 transmits the charging plan created by charging plan creator 115 to charging adapter 6, electric vehicle 3, or charger 4 via communicator 15.

For example, the data format of the charging plan includes the charging start time [s] and the target charging amount [Ah], and defines a plurality of data slots for storing the current values for respective units of time section (for example, every 3 minutes).

Computation system 1 may create a plan for adjusting the temperature in power supply system 40 when battery module 41 in electric vehicle 3 is charged from charger 4. In that case, the temperature adjustment plan is transmitted from computation system 1 to battery manager 42 in electric vehicle 3 directly or via charging adapter 6. For example, the data format of the temperature adjustment plan defines a plurality of data slots for storing target values of temperature for each unit of time (for example, every 3 minutes). Upon receiving the temperature adjustment plan, battery manager 42 adjusts the temperature in battery module 41 according to the temperature adjustment plan. For example, battery manager 42 controls the output of a fan, cooler, or heater (not illustrated) to adjust the temperature in battery module 41.

In the examples illustrated in FIG. 5 to FIG. 9, the charging path that minimizes the degradation amount at the time of charging is found in a state where cells E1 to En connected in series have ideally equal SOCs and SOHs. In practice, however, cells E1-En connected in series often do not have equal SOCs or SOHs.

Figure 10A:
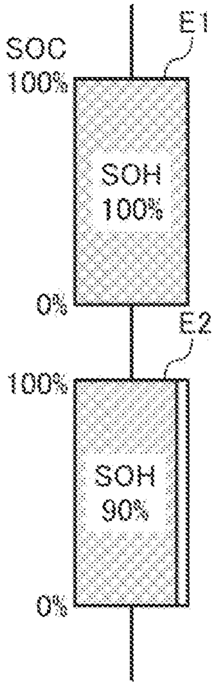
FIG. 10A illustrates a specific example of variations in SOC and SOH between two cells connected in series.
Figure 10B:
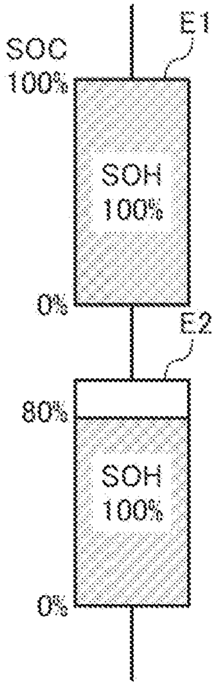
FIG. 10B illustrates a specific example of variations in SOC and SOH between two cells connected in series.
Figure 10C:
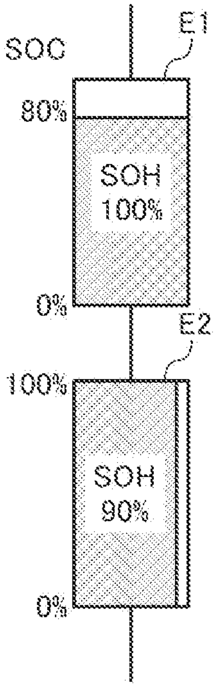
FIG. 10C illustrates a specific example of variations in SOC and SOH between two cells connected in series.

FIG. 10A to FIG. 10C illustrate specific examples of variations in SOC and SOH between two cells E1 and E2 connected in series. The example illustrated in FIG. 10A is an example in which the SOHs of two cells E1 and E2 connected in series are different. Specifically, both of the SOCs of cell E1 and cell E2 are 100%. The SOH of cell E1 is 100%, and the SOH of cell E2 is 90%, indicating that cell E2 is more degraded.

The example illustrated in FIG. 10B is an example in which the SOCs of two cells E1 and E2 connected in series are different. Specifically, both of the SOHs of cell E1 and cell E2 are 100%. The SOC of cell E1 is 100% and the SOC of cell E2 is 80%, indicating that cell E2 has a less capacity.

The example illustrated in FIG. 10C is an example in which both of the SOCs and the SOIs of two cells E1 and E2 connected in series are different. Specifically, the SOC of cell E1 is 80%, and the SOC of cell E2 is 100%, indicating that cell E1 has a less capacity. The SOH of cell E1 is 100%, and the SOH of cell E2 is 90%, indicating that cell E2 is more degraded.

When there are variations between two cells E1 and E2 connected in series, the charging path that minimizes the degradation amount of cell E1 may differ from the charging path that minimizes the degradation amount of cell E2. Accordingly, it is necessary to set an index for determining the charging path for the entire series-connected cells.

A first index is an index that aims at minimizing the degradation amount of the entire cells connected in series. Path finder 113 finds the charging path that minimizes the degradation amount of the cell with a lowest SOH among the cells connected in series. Charging based on such a charging path puts the least load on the cell with a lowest SOH. In a plurality of cells connected in series, the cell with a lowest SOH become bottleneck, and the life of the cell with the lowest SOH determines the life of the entire cells. Use of the first index extends the life of the entire battery module 41.

A second index is an index that aims at minimizing variations in SOH between cells connected in series. Path finder 113 finds the charging path that minimizes the difference in the degradation amount between cells connected in series. Specifically, path finder 113 sets the difference value of the degradation amount (the sum of the differences of the connected cells) as a cost to each path (movement in the horizontal direction and tipper right direction in the case of charging), to find the charging path that minimizes the difference value of the degradation amount. Charging based on such a charging path reduces variations in SOH between cells connected in series. Variations in SOH between cells connected in series lead to a reduction in available capacity and life of the entire cells. On the other hand, the charging path determined based on the second index reduces variations in SOH, contributing to an increase in available capacity and life. In particular, variations in SOH between cells are likely to occur in power supply system 40 which does not include a cell balancing circuit (an equalization circuit).

A third index is an index that aims at preventing reduction of the travelable distance on the next day. Path finder 113 finds the charging path that minimizes the degradation amount of the cell with a lowest actual capacity among the cells connected in series. The actual capacity of a cell (that is, the capacity that can actually be discharged) is defined by SOC×SOH. In charging based on such a charging path, the cell with a lowest actual capacity is reliably charged to the target SOC. The available capacity of the entire cells connected in series depends on the capacity of the cell with a lowest actual capacity. On the other hand, in the charging path determined based on the third index, the cell with the lowest actual capacity is reliably charged to the target SOC. Hence, it is possible to prevent reduction of the available capacity of the entire cells connected in series.

Figure 11:
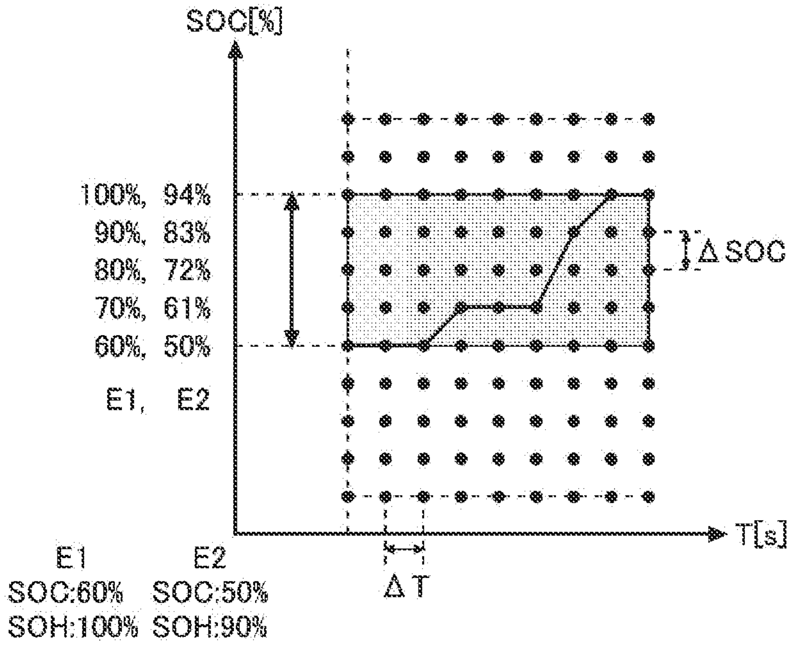
FIG. 11 illustrates an example of charging path finding when two cells have different SOCs and SOHs.

FIG. 11 illustrates an example of charging path finding when two cells E1 and E2 have different SOCs and different SOHs. In the example illustrated in FIG. 11, the SOC and SOH of cell E1 before charging starts are 60% and 100%, respectively. The SOC and SOH of cell E2 before charging starts are 50% and 90%, respectively. In the example illustrated in FIG. 11, the unit SOC (ΔSOC) of cell E1 is set in increments of 10%. The unit SOC (ΔSOC) of cell E2 is set in increments of 9%. The unit SOC (ΔSOC) of cell E2 is calculated by multiplying the unit SOC of cell E1 (ΔSOC=10%) by SOH of cell E2/SOH of cell E1(=90%/100%).

For example, when the first index is set to path finder 113, path finder 113 finds the charging path that minimizes the degradation amount of cell E2. When the third index is set to path finder 113, too, path finder 113 finds the charging path that minimizes the degradation amount of cell E2.

In the examples illustrated in FIG. 5 to FIG. 11, path finder 113 finds the charging path that minimizes the degradation cost at the time of charging. In this regard, path finder 113 may find the charging path that minimizes electricity fees for charging. Cost assigner 114 refers to time-of-use electricity fee table 124 to assign fee costs to paths between nodes. The fee cost is the electricity fees required to pass each path. When the charging time period includes a pay-as-you-go time period, the electricity fees per kWh changes in accordance with the cumulative charging amount in the pay-as-you-go time period.

In the case of a country or region where electricity is traded on the market, such as Pennsylvania New Jersey Maryland (PJM) in the United States, cost assigner 114 obtains the most recent market price for the time slot for charging, and assigns market prices to paths between nodes.

Path finder 113 finds the charging path that minimizes the total fee cost of paths between nodes. Charging plan creator 115 creates a charging plan based on the found charging path. Charging plan outputter 116 transmits the created charging plan to charger 4 directly or via charging adapter 6.

Figure 12:
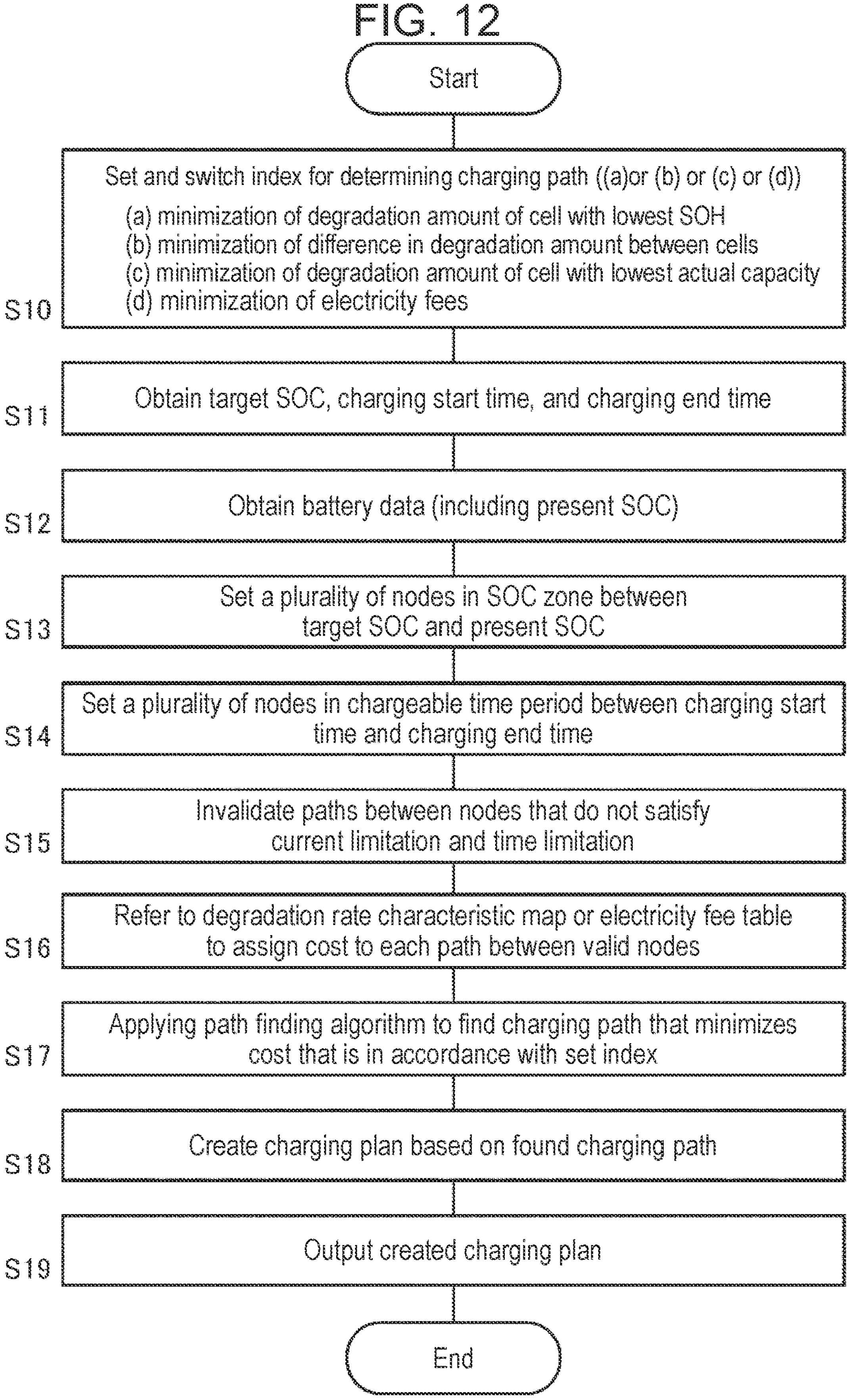
FIG. 12 is a flowchart illustrating a flow of a process of creating a charging plan performed by the computation system according to the embodiment.

FIG. 12 is a flowchart illustrating a flow of a process of creating a charging plan performed by computation system 1 according to the embodiment. The user selects one of the following four indexes for determining the charging path: (a) minimization of the degradation amount of the cell with a lowest SOH among the cells connected in series; (b) minimization of the difference in degradation amount between the cells connected in series; (c) minimization of the degradation amount of the cell with a lowest actual capacity among the cells connected in series; and (d) minimization of electricity fees.

When input information obtainer 111 obtains the index selected by the user input via operator 13, input information obtainer 111 sets the selected index to path finder 113 (S10). The user is able to switch between the four indexes as appropriate. Alternatively, it may be that processor 11 includes an index switcher (not illustrated), and the index switcher switches between the indexes according to a predetermined rule. For example, the index switcher selects index (c) when the SOH of the entire battery module 41 is higher than a first set value, and switches from index (c) to index (a) when the SOH becomes lower than the first set value. Moreover, for example, in a state where the magnitude of difference in SOH between cells E1-En in battery module 41 is less than a second set value, the index switcher selects index (c), and when the magnitude of the variations becomes greater than the second set value, the index switcher switches index (c) to index (b).

Input information obtainer 111 obtains the target SOC at the time of charging of battery module 41 provided in electric vehicle 3, charging start time, and charging end time which are input from operator 13 (S11). Battery data obtainer 112 obtains battery data (including the present SOCs) of cells E1-En included in battery module 41 from vehicle controller 30 of electric vehicle 3 via communicator 15 (S12).

Path finder 113 sets a plurality of nodes at a predetermined interval in the SOC zone that is between the obtained target SOC and present SOC (S13). Path finder 113 sets a plurality of nodes at a predetermined interval in the chargeable time period that is between the obtained charging start time and the charging end time (S14).

Path finder 113 sets paths between the nodes set in a matrix pattern. Cost assigner 114 invalidates paths between nodes that do not satisfy the current limitation and time limitation (S15). Cost assigner 114 refers to at least one of storage degradation rate characteristic map 121, charge cycle degradation rate characteristic map 122, or time-of-use electricity fee table 124 to assign costs to paths between nodes (S16).

Path finder 113 applies a path finding algorithm to find the charging path that minimizes the cost that is in accordance with the set index (S17). Charging plan creator 115 creates a charging plan based on the found charging path (S18). Charging plan outputter 116 transmits the created charging plan to charger 4 directly or via charging adapter 6 (S19).

Figure 13:
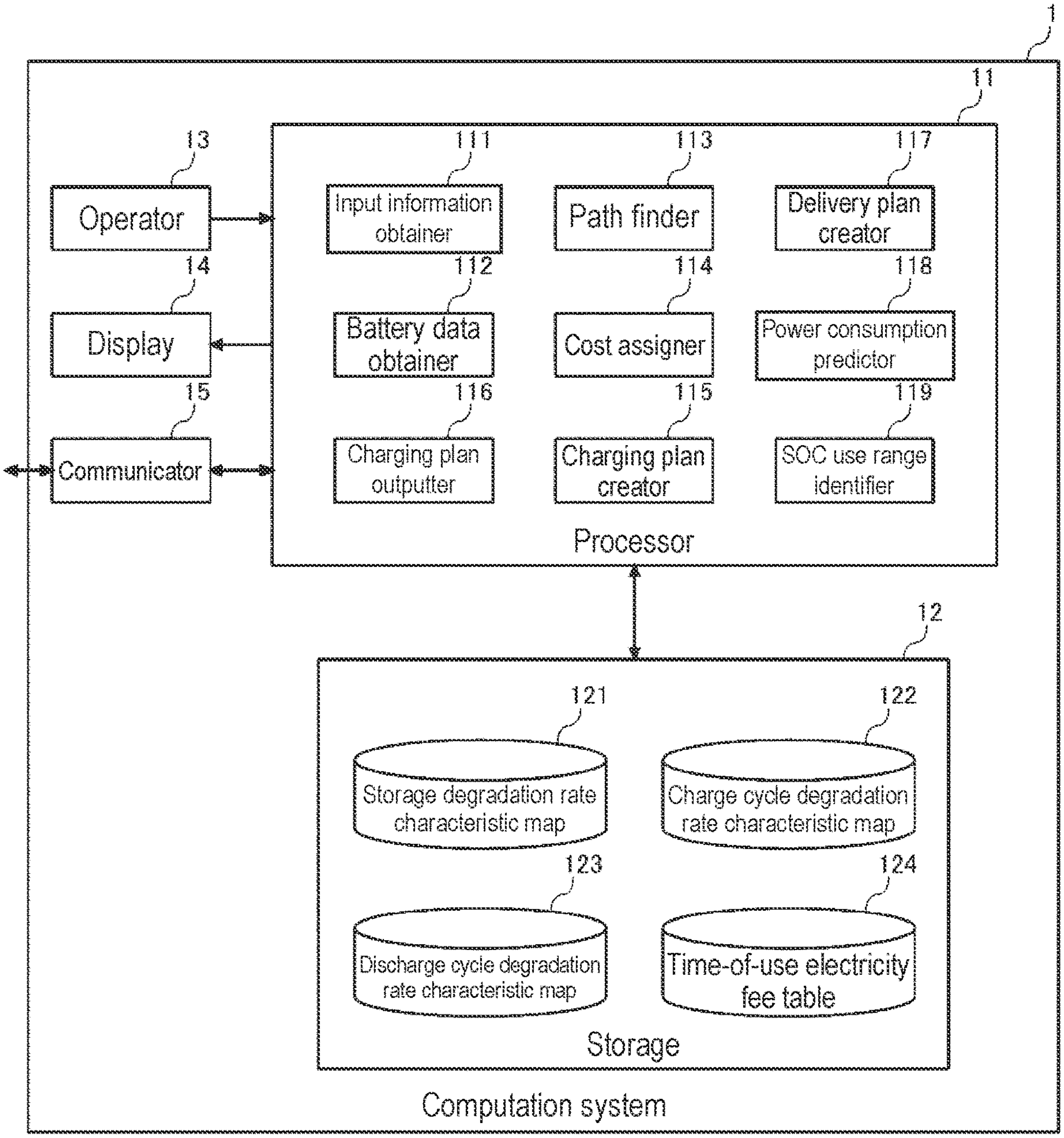
FIG. 13 illustrates configuration example 2 of the computation system according to the embodiment.

FIG. 13 illustrates configuration example 2 of computation system 1 according to the embodiment. In configuration example 1 illustrated in FIG. 3, it is assumed that the target SOC is input by the user. Configuration example 2 additionally includes a function of automatically calculating the target SOC.

In configuration example 2, in addition to input information obtainer 111, battery data obtainer 112, path finder 113, cost assigner 114, charging plan creator 115, and charging plan outputter 116, processor 11 further includes delivery plan creator 117, power consumption predicter 118, and SOC use range identifier 119.

Delivery plan creator 117 creates a delivery plan for the next day for each electric vehicle 3 owned by the delivery company based on order information from an order management system (not illustrated). The delivery plan also includes a delivery route. Based on the delivery route included in the delivery plan, power consumption predicter 118 calculates the travel distance of electric vehicle 3 required for delivery on the next day. Power consumption predicter 118 calculates the power consumption required to travel the calculated distance as a predicted value of the power consumption for the next day.

SOC use range identifier 119 derives a plurality of candidates for the use range of SOC of battery module 41 for the next day based on the predicted power consumption for the next day. For example, when the predicted power consumption for the next (lay is equivalent to 50% of the depth of discharge (DOD) of battery module 41, SOC use range identifier 119 derives 100-50%, 90-40%, 80-30%, 70-20%, 60-10%, and 50-0% as a plurality of candidates for the SOC use range. In this example, candidates are derived in increments of 10%, but candidates may be derived in other increments.

Path finder 113 sets, for each of the candidates for the SOC use range, a plurality of nodes at a predetermined interval in the SOC use range. Path finder 113 sets a plurality of nodes at a predetermined interval in the delivery time period that is between the delivery start time and the delivery end time based on the delivery plan for the next day. Path finder 113 sets paths between the nodes set in a matrix pattern. Cost assigner 114 refers to storage degradation rate characteristic map 121 and discharge cycle degradation rate characteristic map 123 to assign degradation costs to paths between nodes.

Path finder 113 finds, for each of the plurality of candidates for the SOC use range, the discharging path that minimizes the total degradation cost of paths between nodes. Path finder 113 identifies the SOC use range of the discharging path with the lowest minimum total degradation cost among the discharging paths which minimizes the total degradation costs for the plurality of candidates for the SOC use range. Path finder 113 sets the upper limit SOC of the identified SOC use range to the target SOC at the time of charging.

Figure 14:
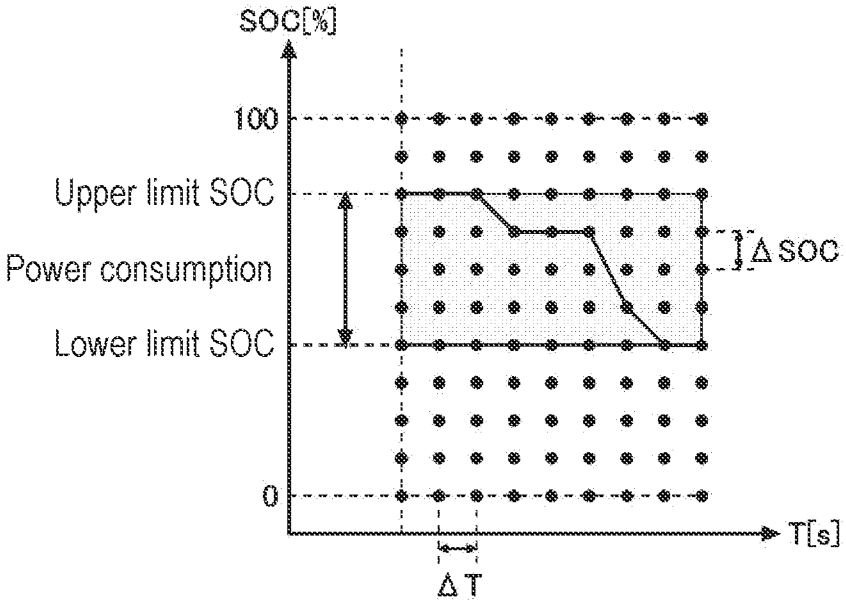
FIG. 14 illustrates an example of discharging path finding.

FIG. 14 illustrates an example of discharging path finding. FIG. 14 illustrates an example of creating a discharging plan based on a delivery plan in which power consumption is predicted to be 40% of DOD. Path fin der 113 finds the optimum path from the optimum upper limit SOC to the optimum lower limit SOC within the delivery time period of the next day. In the example illustrated in FIG. 14, the discharging path with the upper limit SOC of 80% and the lower limit SOC of 40% is selected as the optimum path.

The method of assigning the degradation costs to paths between nodes is the same as that for finding a charging path described above, except that the relationship is inverse.

Figure 15:
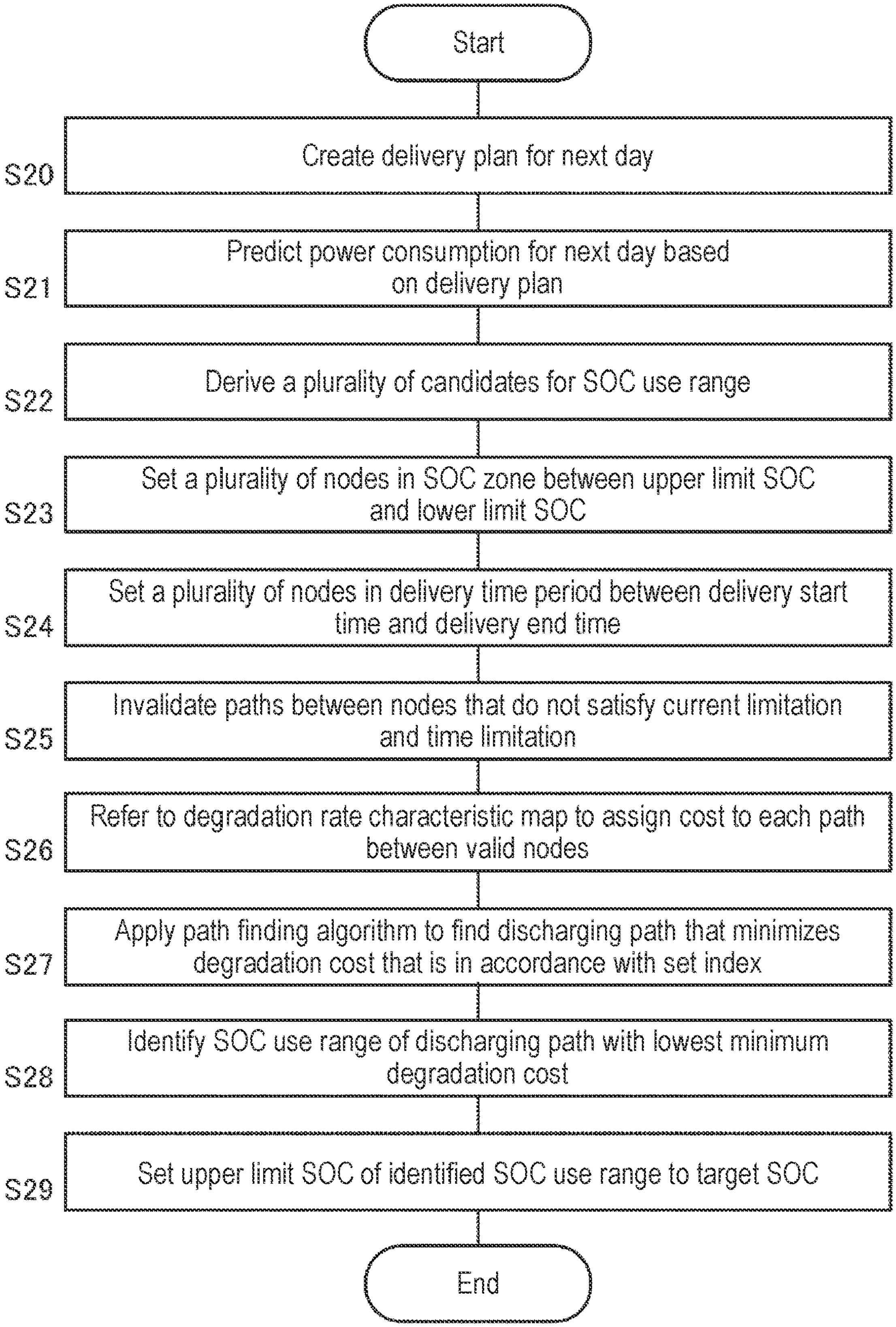
FIG. 15 is a flowchart illustrating a flow of a process of deriving a target SOC performed by the computation system according to the embodiment.

FIG. 15 is a flowchart illustrating a flow of a process of deriving a target SOC performed by computation system 1 according to the embodiment. Delivery plan creator 117 creates a delivery plan of electric vehicle 3 for the next day based on order information from an order management system (not illustrated) (S20). Based on the delivery route included in the delivery plan, power consumption predicter 118 calculates the travel distance of electric vehicle 3 required for delivery on the next day, and predicts the power consumption required to travel, the distance (S21).

SOC use range identifier 119 derives a plurality of candidates for the SOC use range of battery module 41 for the next day based on the predicted power consumption for the next day (S22). For each of the candidates for the SOC use range, path finder 113 sets a plurality of nodes at a predetermined interval in the SOC zone between the upper limit SOC and the lower limit SOC of the SOC use range (S23). Path finder 113 sets a plurality of nodes at a predetermined interval in the delivery time period between the delivery start time and the delivery end time (S24).

Path finder 113 sets paths between the nodes set in a matrix pattern. Cost assigner 114 invalidates paths between nodes that do not satisfy the current limitation and time limitation (S25). Cost assigner 114 refers to storage degradation rate characteristic map 121 and discharge cycle degradation rate characteristic map 123 to assign degradation costs to paths between nodes (S26).

Path finder 113 applies a path finding algorithm to find the discharging path that minimizes the degradation cost that is in accordance with the set index (S27). In configuration example 2, the index is selected from the following three indexes: (a) minimization of the degradation amount of the cell with a lowest SOH among the cells connected in series; (b) minimization of the difference in the degradation amount between the cells connected in series; and (c) minimization of the degradation amount of the cell with a lowest actual capacity among the cells connected in series.

Path finder 113 identifies the SOC use range of the discharging path with the lowest minimum degradation cost among the discharging paths that minimizes degradation costs for the plurality of candidates for the SOC use range (S28). Path finder 113 sets the upper limit SOC of the identified SOC use range to the target SOC at the time of charging (S29).

In the flowchart illustrated in FIG. 15, path finder 113 identifies the SOC use range of the discharging path with the lowest minimum degradation cost among the discharging paths with the minimum degradation costs for the plurality of candidates for the SOC use range. In this regard, the SOC use range may be identified by the following process. Path finder 113 calculates a total degradation amount [i] of the discharging path with the minimum degradation cost for each of a plurality (i) of candidates for the SOC use range. Path finder 113 calculates, for each of the plurality (i) of candidates for the SOC use range, the total degradation amount [i] of the charging path with the minimum degradation cost from the present SOC to the upper limit SOC of the SOC use range. For each of the plurality (i) of candidates for the SOC use range, path finder 113 adds up the total degradation amount [i] of the discharging path with the minimum degradation cost and the total degradation amount [i] of the charging path with the minimum degradation cost. Path finder 113 identifies the SOC use range with the minimum total degradation amount [i]. In this case, there is no need to find a new charging path, and a charging plan is created based on the charging path with the minimum degradation cost calculated above.

Moreover, the SOC use range may be identified by the following process. For each of a plurality (i) of candidates for the SOC use range, path finder 113 applies the predicted discharge pattern to calculate a total degradation amount [i] of the discharging path. For example, for each of candidates for the SOC use range of 100-50%, 90-40%, 80-30%, 70-20%, 60-10%, and 50-0%, path finder 113 calculates a total degradation amount [i] of the discharging path when applying the discharge pattern corresponding to the travel pattern predicted based on the delivery plan. Path finder 113 calculates, for each of the plurality (of candidates for the SOC use range, a total degradation amount [i] of the charging path that minimizes the degradation cost from the present SOC to the upper limit SOC of the SOC use range. For each of the plurality (i) of candidates for the SOC use range, path finder 113 adds up the total degradation amount [i] of the discharging path and the total degradation amount [i] of the charging path. Path finder 113 identifies the SOC use range with a minimum total degradation amount [i]. In this case, there is no need to find a new charging path, and a charging plan is created based on the charging path with the minimum degradation cost calculated above.

Figure 16:
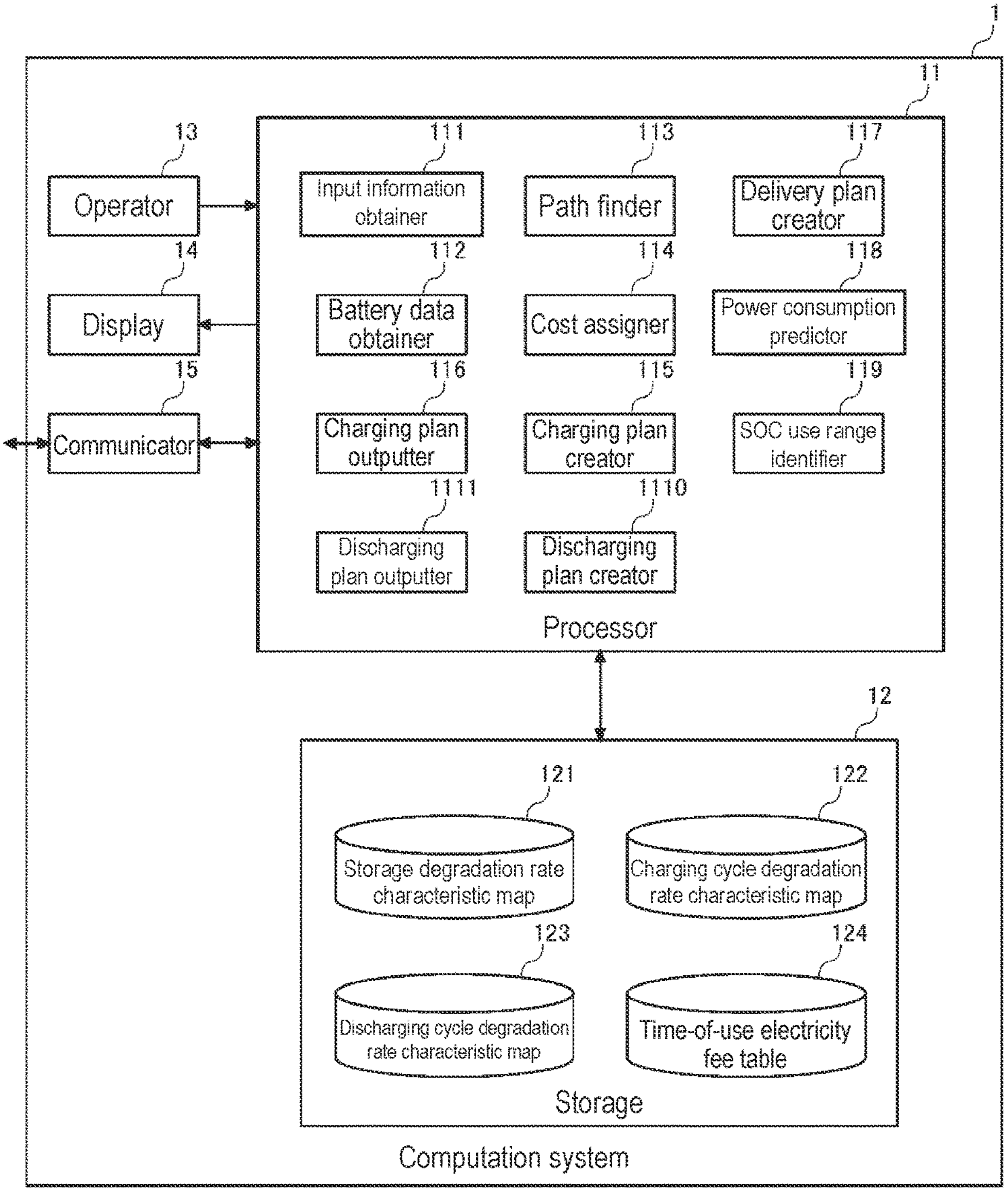
FIG. 16 illustrates configuration example 3 of the computation system according to the embodiment.

FIG. 16 illustrates configuration example 3 of computation system 1 according to the embodiment. Configuration example 3 additionally includes a function of creating a discharging plan. In configuration example 3, in addition to input information obtainer 111, battery data obtainer 112, path finder 113, cost assigner 114, charging plan creator 115, charging plan outputter 116, delivery plan creator 117, power consumption predicter 118, and SOC use range identifier 119, processor 11 further includes discharging plan creator 1110 and discharging plan outputter 1111.

Figure 17:
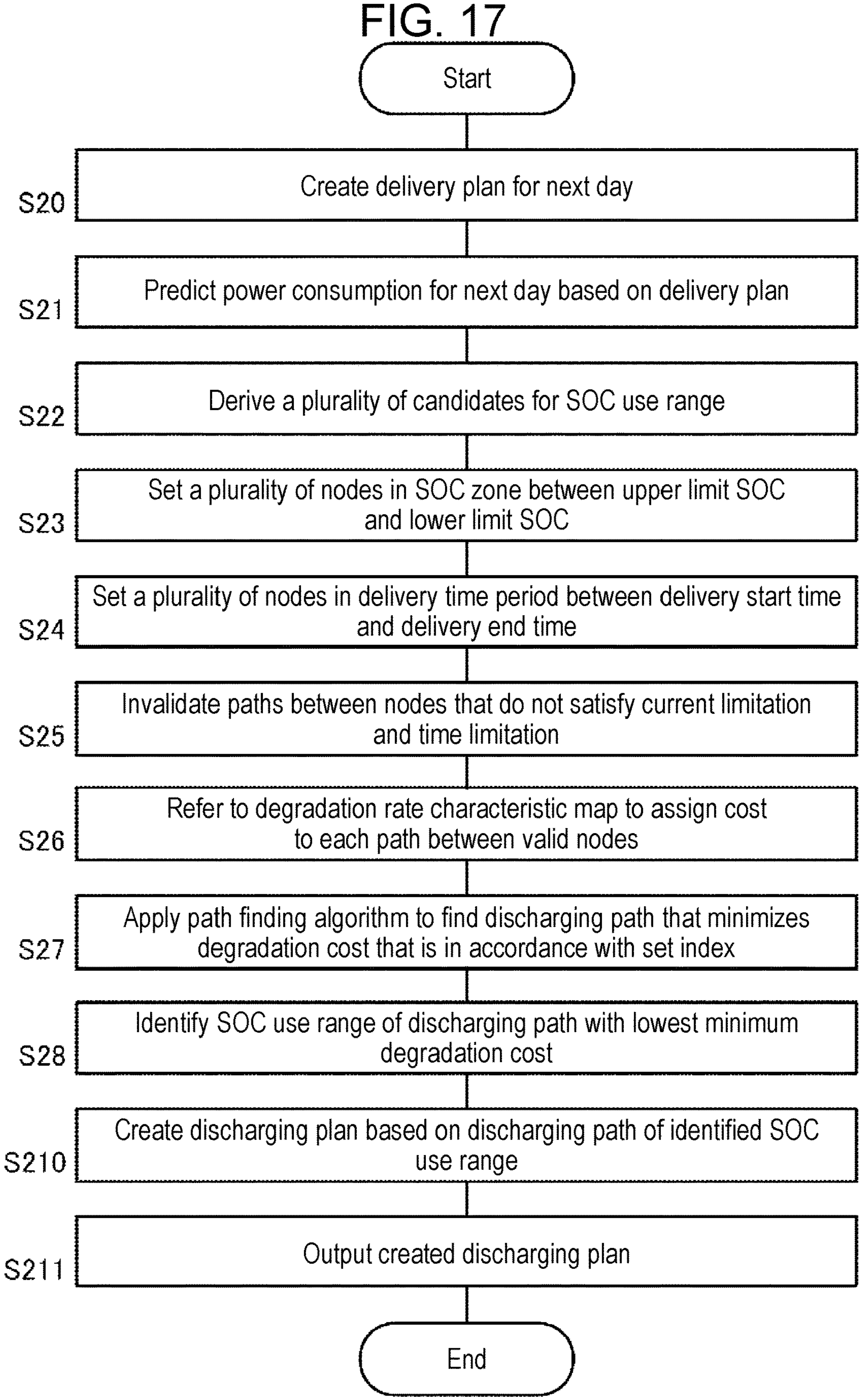
FIG. 17 is a flowchart illustrating a flow of a process of creating a discharging plan performed by the computation system according to the embodiment.

FIG. 17 is a flowchart illustrating a flow of a process of creating a discharging plan performed by computation system 1 according to the embodiment. The processes from step S20 to step S28 in the flowchart illustrated in FIG. 17 are the same as the processes from step S20 to step S28 in the flowchart illustrated in FIG. 15.

Path finder 113 identifies the SOC range of the discharging path with the lowest minimum degradation cost among the discharging paths with the minimum degradation costs for the plurality of candidates for the SOC use range (S28). Discharging plan creator 1110 creates a discharging plan based on the discharging path with the minimum degradation cost of the identified SOC use range (S210). Specifically, discharging plan creator 1110 converts the identified discharging path into a discharging plan defined by the travel start time (discharging start time) and the current value for each unit of time section.

For example, the data format of the discharging plan includes the travel start time [s] and the predicted power consumption [Ah], and defines a plurality of data slots for storing the current values for respective units of time section. Note that discharging plan creator 1110 may convert the current value for each unit of time section into the speed of electric vehicle 3, and store the recommended speed of electric vehicle 3 for each unit of time section in a plurality of data slots.

Discharging plan outputter 1111 transmits the created discharging plan to electric vehicle 3 directly or via charging adapter 6 (S211).

Upon receiving the discharging plan, vehicle controller 30 in electric vehicle 3 displays the recommended speed for each time slot on the in-vehicle display (for example, the display of the car navigation system, or the meter display). When electric vehicle 3 is an automatic driving vehicle, electric vehicle 3 travels at a speed that is as close as possible to the recommended speed for each time slot within the range of safety standards.

The process in the flowchart illustrated in FIG. 17 is a process performed assuming that the battery can be charged in advance to the optimum upper limit SOC before the start of delivery. In this regard, when creating a discharging plan with the present SOC as the discharge start SOC, processing is performed as follows. SOC use range identifier 119 converts the power consumption predicted by power consumption predicter 118 into the DOD of battery module 41. SOC use range identifier 119 sets the present SOC to the upper limit SOC of the SOC use range, and sets a value obtained by subtracting the DOD from the upper limit SOC to the lower limit SOC of the SOC use range.

Path finder 113 sets a plurality of nodes in the SOC use range determined by SOC use range identifier 119, and sets a plurality of nodes in the travelable time period (dischargeable time period) that is between the travel start time (discharging start time) and the travel end time (discharging end time). Cost assigner 114 refers to storage degradation rate characteristic map 121 and discharge cycle degradation rate characteristic map 123 to assign degradation costs to paths between nodes. Path finder 113 finds the discharging path that minimizes the total degradation cost of paths between nodes among discharging paths from the upper limit SOC of the SOC use range at the travel start time to the lower limit SOC of the SOC use range at the travel end time via a plurality of nodes.

As described above, according to the present embodiment, it is possible to create a charging plan or a discharging plan that minimizes costs, such as degradation of the secondary battery. For charging electric vehicle 3 used for delivery business, etc., it is desirable to create a charging plan that minimizes the degradation amount of the secondary battery during the nighttime when the electricity fees are low. The SOC at the start of charging and the chargeable time period available for charging change daily. It is necessary to create an optimum charging plan according to such changes in the SOC at the charting start time and chargeable time period.

In the present embodiment, charging from the present SOC to the target SOC is considered using a path problem. In other words, it is possible to create the optimum charging plan by setting the degradation amount to the passage cost of each path with reference to storage degradation rate characteristic map 121 and charge cycle degradation rate characteristic map 122, and finding the path which minimizes the degradation amount.

With this method, it is possible find the charging pattern with the minimum degradation amount within a specified time period (chargeable time period), and it is possible to collectively perform optimization control on the three elements of current control, time control, and storage SOC. Conventionally, it was not possible to simultaneously obtain the determination of the three elements of current control, time control, and storage SOC with a single mechanism.

Moreover, in the present embodiment, the battery data (SOC, SOH) of cells E1-En is input, so that the amount of degradation of battery module 41 as a whole can be minimized. It is also possible to reduce an increase in the SOH difference between cells E1-En. These control modes can be easily switched by switching the cost index for the paths depending on the intended use.

The present disclosure has been described above based on the embodiment. The embodiment has been given by way of illustration. It will be understood by those skilled in the art that various modifications may be made to combinations of the structural elements and processes, and all such modifications are also intended to fall within the scope of the present disclosure.

In the embodiment described above, four indexes are given as examples. In this regard, an index that aims at both reduction of the cell degradation and saving of electricity fees may be provided. For example, path finder 113 calculates the degradation amount cost and electricity fee cost for each selectable charging path, performs a weighted addition or weighted average on the costs to calculate the total cost, and identifies the charging path with the minimum total cost.

In the embodiment, the example has been described where a charging plan is transmitted to charger 4 via charging adapter 6 from computation system 1. In this regard, charging adapter 6 is not essential, and can be omitted. In that case, the charging plan is transmitted to charger 4 from computation system 1 directly or via electric vehicle 3.

In addition, the index that aims at minimizing electricity fees is not essential, and can be omitted. In that case, time-of-use electricity fee table 124 can be omitted.

In the embodiment, the example has been described where a charging plan or a discharging plan for battery module 41 provided in electric vehicle 3 is created. In this regard, electric vehicle 3 may be a two-wheel electric motorcycle (electric scooter) or an electric bicycle. Examples of electric vehicle 3 include low-speed electric vehicle 3, such as a golf cart and a land car used in shopping malls, entertainment facilities, and the like. Moreover, the object in which battery module 41 is provided is not limited to electric vehicle 3. For example, electric moving bodies, such as electric ships, railroad vehicles, and multicopters (drones), are also included.

The embodiment may be identified by the following items.

[Item 1] A computation system (1) includes: a path finder (113) which (i) sets a plurality of nodes in a state of charge (SOC) zone that is between a target SOC and a present SOC of a secondary battery (41) provided in an electric moving body (3), (ii) sets a plurality of nodes in a chargeable time period that is between a charging start time and a charging end time, and (iii) finds a charging path from the present SOC at the charging start time to the target SOC at the charging end time via nodes among the plurality of nodes set in the SOC zone and the chargeable time period, the target SOC being set when the secondary battery (41) is charged; a charging plan creator (115) which creates a charging plan based on the charging path found; a cost assigner (114) which refers to at least one of a storage degradation characteristic (121), a charge cycle degradation characteristic (122), or a time-of-use electricity fee table (124) to assign a cost of a degradation amount or an electricity fee to each of paths between the plurality of nodes, the storage degradation characteristic (121) being defined by at least one element including at least one of the SOC or a temperature of the secondary battery (41), the charge cycle degradation characteristic (122) defining a cycle degradation rate at a time of charging that is defined by at least one element including at least one of the SOC or a current rate of charging current of the secondary battery (41). The path finder (113) finds a charging path that minimizes a total cost of paths between the nodes.

With this, it is possible to create a charging plan that minimizes charging cost.

[Item 2] In the computation system (1) according to item 1, the charging plan creator (115) creates a charging plan including the charging start time and a current value in each of sections of time.

With this, the current supplied from the charger (4) to the secondary battery (41) provided in the electric moving body (3) can be optimally controlled.

[Item 3] In the computation system (1) according to item 1 or item 2, the cost assigner (114) invalidates a path with a current rate that exceeds an upper limit value of the charging current among the paths between the plurality of nodes, the current rate being required for passage of each of the paths.

With this, it is possible to prevent an impractical charging plan from being created.

[Item 4] In the computation system (1) according to any one of item 1 to item 3, the secondary battery (41) includes a plurality of cells (E1-En) connected in series, and the path finder (113) finds a charging path that minimizes a degradation amount of a cell with a lowest state of health (SOH) among the plurality of cells (E1-En).

With this, it is possible to create a charging plan that minimizes the degradation amount of the entire cells (E1-En).

[Item 5] In the computation system (1) according to any one of item 1 to item 3, the secondary battery (41) includes a plurality of cells (E1-En) connected in series, and the path finder (113) finds a charging path that minimizes a difference in a degradation amount between the plurality of cells (E1-En).

With this, it is possible to create a charging plan that leads to reduction in variations in the degradation amount between the cells (E1-En).

[Item 6] In the computation system (1) according to any one of item 1 to item 3, the secondary battery (41) includes a plurality of cells (E1-En) connected in series, and the path finder (113) finds a charging path that minimizes a degradation amount of a cell with a lowest actual capacity among the plurality of cells (E1-En).

With this, it is possible to create a charging plan that can avoid reduction of the travelable distance of the electric vehicle (3).

[Item 7] In the computation system (1) according to any one of item 1 to item 3, the path finder (113) finds a charging path that minimizes a total electricity fee of the paths between the nodes.

With this, it is possible to create a charging plan that minimizes the electricity fees.

[Item 8] In the computation system (1) according to any one of item 1 to item 7, the path finder (113) is capable of switching an index for determining a cost of a charging path to be minimized.

With this, flexible control can be performed according to the situation.

[Item 9] The computation system (1) according to any one of item 1 to item 8, further includes a SOC use range identifier (19) which derives a plurality of candidates for a SOC use range of the secondary battery (41) based on power consumption predicted to be required for a next use of the electric moving body (3). For each of the plurality of candidates for the SOC use range derived, the path finder (113) sets a plurality of nodes in the SOC use range, and sets a plurality of nodes in a use time period that is between a next use start time and a next use end time of the electric moving body (3), the cost assigner (114) refers to the storage degradation characteristic (121) and a discharge cycle degradation characteristic (123) to assign a degradation cost to each of paths between nodes among the plurality of nodes set in the SOC use range and the use time period, the discharge cycle degradation characteristic (123) defining a cycle degradation rate at a time of discharging that is defined by at least one element including at least one of the SOC or a current rate of discharging current of the secondary battery (41), and the path finder (113) (i) finds, for each of the plurality of candidates for the SOC use range, a discharging path that minimizes a total degradation cost of the paths between the nodes, (ii) identifies a SOC use range of a discharging path with a lowest total degradation cost among the discharging paths each of which minimizes the total degradation cost, and (iii) sets, to the target SOC, an upper limit value of the SOC use range identified.

With this, the target SOC at the time of charging can be automatically determined.

[Item 10] The computation system (1) according to any one of item 1 to item 8, further includes a SOC use range identifier (119) which derives a plurality of candidates for a SOC use range of the secondary battery (41) based on power consumption predicted to be required for a next use of the electric moving body (3). The path finder (113) (i) calculates a degradation amount of a discharging path based on a predicted discharging pattern for each of the plurality of candidates for the SOC use range derived, (ii) calculates a degradation amount of a charging path with a minimum degradation cost from a present SOC to an upper limit SOC for each of the plurality of candidates for the SOC use range, (iii) determines a SOC use range which minimizes a sum of the degradation amount of the discharging path and the degradation amount of the charging path, and (v) sets, to the target SOC, an upper limit value of the SOC use range determined.

With this, the target SOC at the time of charging can be automatically determined.

[Item 11] A charging plan creation program for causing a computer to perform: setting a plurality of nodes in a state of charge (SOC) zone that is between a target SOC and a present SOC of a secondary battery (41) provided in an electric moving body (3), and setting a plurality of nodes in a chargeable time period that is between a charging start time and a charging end time, the target SOC being set when the secondary battery (41) is charged; referring to at least one of a storage degradation characteristic (121), a charge cycle degradation characteristic (122), or a time-of-use electricity fee table (124) to assign a cost of a degradation amount or an electricity fee to each of paths between the plurality of nodes set in the SOC zone and the chargeable time period, the storage degradation characteristic (121) being defined by at least one element including at least one of the SOC or a temperature of the secondary battery (41), the charge cycle degradation characteristic (122) defining a cycle degradation rate at a time of charging that is defined by at least one element including at least one of the SOC or a current rate of charging current of the secondary battery (41), finding a charging path that minimizes a total cost of paths between the nodes among charging paths from the present SOC at the charging start time to the target SOC at the charging end time via the nodes; and creating a charging plan based on the charging path found.

With this, it is possible to create a charging plan that minimizes the charging cost.

[Item 12] A computation system (1) includes: a path finder (113) which (i) sets a plurality of nodes in a state of charge (SOC) use range that is set when a secondary battery (41) provided in an electric moving body (3) is discharged, (i) sets a plurality of nodes in a dischargeable time period that is between a discharging start time and a discharging end time, and (iii) finds a discharging path from an upper limit SOC of the SOC use range at the discharging start time to a lower limit SOC of the SOC use range at the discharging end time via nodes among the plurality of nodes set in the SOC use range and the dischargeable time period; a discharging plan creator (1110) which creates a discharging plan based on the discharging path found; and a cost assigner (114) which refers to a storage degradation characteristic (121) and a discharge cycle degradation characteristic (123) to assign a degradation cost to each of paths between the plurality of nodes, the storage degradation characteristic (121) defined by at least one element including at least one of the SOC or a temperature of the secondary battery (41), the discharge cycle degradation characteristic (123) defining a cycle degradation rate at a time of discharging that is defined by at least one element including at least one of the SOC or a current rate of discharging current of the secondary battery (41). The path finder (113) finds a discharging path that minimizes a total degradation cost of the paths between the nodes.

With this, it is possible to create a discharging plan that minimizes the discharging cost.

[Item 13] A discharging plan creation program causing a computer to perform: setting a plurality of nodes in a state of charge (SOC) use range that is set when a secondary battery (41) provided in an electric moving body (3) is discharged, and setting a plurality of nodes in a dischargeable time period that is between a discharging start time and a discharging end time; referring to a storage degradation characteristic (121) and a discharge cycle degradation characteristic (123) to assign a degradation cost to each of paths between nodes among the plurality of nodes set in the SOC use range and the dischargeable time period, the storage degradation characteristic (121) being defined by at least one element including at least one of the SOC or a temperature of the secondary battery (41), the discharge cycle degradation characteristic defining a cycle degradation rate at a time of discharging that is defined by at least one element including at least one of the SOC or a current rate of discharging current of the secondary battery (41); finding a discharging path that minimizes a total degradation cost of paths between the nodes among discharging paths from an upper limit SOC of the SOC use range at the discharging start time to a lower limit SOC of the SOC use range at the discharging end time via the nodes; and creating a discharging plan based on the discharging path found.

With this, it is possible to create a discharging plan that minimizes the discharging cost.

REFERENCE MARKS IN THE DRAWINGS

1 computation system
2 network
3 electric vehicle
4 charger
5 commercial power system
6 charging adaptor
11 processor
111 input information obtainer
112 battery data obtainer
113 path finder
114 cost assigner
115 charging plan creator
116 charging plan outputter
117 delivery plan creator
118 power consumption predictor
119 SOC use range identifier
1110 discharging plan creator
1111 discharging plan outputter
12 storage
121 storage degradation rate characteristic map
122 charge cycle degradation rate characteristic map
123 discharge cycle degradation rate characteristic map
124 time-of-use electricity fee table
13 operator
14 display
15 communicator
30 vehicle controller
34 motor
35 inverter
36 wireless communicator
36*a* antenna
40 power supply system
41 battery module
42 battery manager
43 voltage measurer
44 temperature measurer

45 current measurer

46 battery controller

E1-En cell

RY1,RY2 relay

T1,T2 temperature sensor

Rs shunt resistor

The invention claimed is:

1. A computation system comprising:

at least one processor configured to:

set a plurality of nodes in a state of charge (SOC) zone that is between a target SOC and a present SOC of a secondary battery provided in an electric moving body;

set a plurality of nodes in a chargeable time period that is between a charging start time and a charging end time of the secondary battery;

find a charging path from the present SOC at the charging start time to the target SOC at the charging end time via nodes among the plurality of nodes set in the SOC zone and the plurality of nodes set in the chargeable time period, the target SOC being set when the secondary battery is charged;

create a charging plan based on the charging path found;

refer to at least one of a storage degradation characteristic and a charge cycle degradation characteristic, to assign a cost of a degradation amount to each of paths between the plurality of nodes, the storage degradation characteristic being defined by at least one element including at least one of the SOC or a temperature of the secondary battery, the charge cycle degradation characteristic defining a cycle degradation rate at a time of charging that is defined by at least one element including at least one of the SOC or a current rate of charging current of the secondary battery;

find a charging path that minimizes a total cost of paths between the nodes;

create a charging plan including the charging start time and a current value in each of sections of time;

transmit the charging plan for charging the secondary battery for receipt;

cause the secondary battery to follow the charging plan received to charge;

derive a plurality of candidates for a SOC use range of the secondary battery based on power consumption predicted to be required for a next use of the electric moving body;

set, for each of the plurality of candidates derived for the SOC use range, the path finder sets a plurality of nodes in the SOC use range;

set a plurality of nodes in a use time period that is between a next use start time and a next use end time of the electric moving body;

refer to the storage degradation characteristic and a discharge cycle degradation characteristic to assign a degradation cost to each of paths between nodes among the plurality of nodes set in the SOC use range and the use time period, the discharge cycle degradation characteristic defining a cycle degradation rate at a time of discharging that is defined by at least one element including at least one of the SOC or a current rate of discharging current of the secondary battery;

find, for each of the plurality of candidates for the SOC use range, at least one discharging path that minimizes a total degradation cost of the paths between the nodes;

identify a SOC use range of a discharging path with a lowest total degradation cost among the at least one discharging path each of which minimizes the total degradation cost; and set, to the target SOC, an upper limit value of the SOC use range identified.

2. The computation system according to claim 1, wherein the processor is configured to invalidate a path with a current rate that exceeds an upper limit value of the charging current among the paths between the plurality of nodes, the current rate being required for passage of each of the paths.

3. The computation system according to claim 1, wherein the secondary battery includes a plurality of cells connected in series, and the processor is configured to find a charging path that minimizes a degradation amount of a cell with a lowest state of health (SOH) among the plurality of cells.

4. The computation system according to claim 1, wherein the secondary battery includes a plurality of cells connected in series, and the processor is configured to find a charging path that minimizes a difference in a degradation amount between the plurality of cells.

5. The computation system according to claim 1, wherein the secondary battery includes a plurality of cells connected in series, and the processor is configured to find a charging path that minimizes a degradation amount of a cell with a lowest actual capacity among the plurality of cells.

6. The computation system according to claim 1, wherein the processor is configured to find a charging path that minimizes a total electricity fee of the paths between the nodes.

7. The computation system according to claim 1, wherein the processor is configured to switch an index for determining a cost of a charging path to be minimized.

8. The computation system according to claim 1, wherein the processor is configured to:

derive a plurality of candidates for a SOC use range of the secondary battery based on power consumption predicted to be required for a next use of the electric moving body;

calculate a degradation amount of at least one discharging path based on a predicted discharging pattern for each of the plurality of candidates for the SOC use range derived;

calculate a degradation amount of a charging path with a minimum degradation cost from a present SOC to an upper limit SOC for each of the plurality of candidates for the SOC use range;

determine a SOC use range which minimizes a sum of the degradation amount of the at least one discharging path and the degradation amount of the charging path; and set to the target SOC, an upper limit value of the SOC use range determined.

9. A non-transitory machine-readable recording medium that stores a program a charging plan creation program for causing a computer to:

set a plurality of nodes in a state of charge (SOC) zone that is between a target SOC and a present SOC of a secondary battery provided in an electric moving body;

set a plurality of nodes in a chargeable time period that is between a charging start time and a charging end time of the secondary battery, the target SOC being set when the secondary battery is charged;

refer to at least one of a storage degradation characteristic, a charge cycle degradation characteristic, to assign a cost of a degradation amount to each of paths between the plurality of nodes set in the SOC zone and the chargeable time period, the storage degradation characteristic being defined by at least one element including at least one of the SOC or a temperature of the secondary battery, the charge cycle degradation characteristic defining a cycle degradation rate at a time of charging that is defined by at least one element including at least one of the SOC or a current rate of charging current of the secondary battery;

find a charging path that minimizes a total cost of the paths between the nodes among charging paths from the present SOC at the charging start time to the target SOC at the charging end time via the nodes;

create a charging plan based on the charging path found;

transmit the charging plan for charging the secondary battery for receipt; and cause the secondary battery to follow the charging plan received to charge;

derive a plurality of candidates for a SOC use range of the secondary battery based on power consumption predicted to be required for a next use of the electric moving body;

set, for each of the plurality of candidates derived for the SOC use range, the path finder sets a plurality of nodes in the SOC use range;

set a plurality of nodes in a use time period that is between a next use start time and a next use end time of the electric moving body:

refer to the storage degradation characteristic and a discharge cycle degradation characteristic to assign a degradation cost to each of paths between nodes among the plurality of nodes set in the SOC use range and the use time period, the discharge cycle degradation characteristic defining a cycle degradation rate at a time of discharging that is defined by at least one element including at least one of the SOC or a current rate of discharging current of the secondary battery;

find, for each of the plurality of candidates for the SOC use range, at least one discharging path that minimizes a total degradation cost of the paths between the nodes;

identify a SOC use range of a discharging path with a lowest total degradation cost among the at least one discharging path each of which minimizes the total degradation cost; and set, to the target SOC, an upper limit value of the SOC use range identified.

10. The computation system according to claim 1, wherein the secondary battery is charged in accordance with the charging plan received.

11. The computation system according to claim 1, wherein the charging plan is received by a wireless communicator of the electric moving body in communication with an electronic control unit (ECU) of the electric moving body, wherein charging of the secondary battery is controlled by the ECU.

12. The computation system according to claim 1, wherein the secondary battery is housed in a battery module of the moving electric body.

13. The computation system according to claim 1, wherein the charging plan is transmitted to and received by the electric moving body, a charging adapter, or a charger.

14. The non-transitory machine-readable recording medium according to claim 9, wherein the secondary battery is charged in accordance with the charging plan received.

15. The non-transitory machine-readable recording medium according to claim 9, wherein the charging plan is received by a wireless communicator of the electric moving body in communication with an electronic control unit (ECU) of the electric moving body, wherein charging of the secondary battery is controlled by the ECU.

16. The non-transitory machine-readable recording medium according to claim 9, wherein the charging plan is transmitted to and received by the electric moving body, a charging adapter, or a charger.

* * * * *